United States Patent [19]

Yamashita et al.

[11] Patent Number: 5,576,393

[45] Date of Patent: Nov. 19, 1996

[54] POLYMER PARTICLES, METHOD OF PRODUCING THE SAME, AND TONER FOR USE IN ELECTROPHOTOGRAPHY COMPRISING THE POLYMER PARTICLES

[75] Inventors: Hiroshi Yamashita, Numazu; Hiromitsu Kawase, Mishima; Keiko Shiraishi, Susono, all of Japan

[73] Assignee: Ricoh Company, Ltd., Tokyo, Japan

[21] Appl. No.: 452,332

[22] Filed: May 26, 1995

Related U.S. Application Data

[62] Division of Ser. No. 449,424, May 24, 1995, Pat. No. 5,541,031, which is a continuation of Ser. No. 165,101, Dec. 10, 1993, abandoned.

[30] Foreign Application Priority Data

Dec. 10, 1992 [JP] Japan .................................. 4-330293

[51] Int. Cl.⁶ ..................... C08F 265/04; C08F 257/02; C08F 2/14
[52] U.S. Cl. .................... 525/293; 525/256; 525/258; 525/296; 525/309; 525/301; 525/287; 525/291; 525/305; 525/285; 525/312; 430/109; 430/111
[58] Field of Search .................... 525/256, 258, 525/296, 309, 301, 287, 291, 305, 285, 293, 312

[56] References Cited

U.S. PATENT DOCUMENTS

| 4,885,350 | 12/1989 | Yamashita | 526/201 |
| 5,061,766 | 10/1991 | Yamashita | 526/191 |
| 5,219,694 | 6/1993 | Anno | 430/106.6 |
| 5,219,943 | 6/1993 | Akasaki | 525/273 |
| 5,354,640 | 10/1994 | Kanbayashhi | 430/110 |

*Primary Examiner*—Vasu S. Jagannathan
*Attorney, Agent, or Firm*—Cooper & Dunham LLP

[57] ABSTRACT

Polymer particles which are substantially spherical and have protrusions on the surface thereof, with such a particle size distribution that the volume mean diameter dv thereof is $1 \leq dv \leq 15$ (μm), and the ratio of the volume mean diameter dv to the number mean diameter dn thereof, that is, dv/dn, is $1 \leq dv/dn \leq 1.2$, are prepared, and used as a component for a toner for use in electrophotography.

1 Claim, 1 Drawing Sheet

5μm

POLYMER PARTICLES, METHOD OF PRODUCING THE SAME, AND TONER FOR USE IN ELECTROPHOTOGRAPHY COMPRISING THE POLYMER PARTICLES

This application is a division of application Ser. No. 08/449,424, filed May 24, 1995, now U.S. Pat. No. 5,541,031 which is a continuation of application Ser. No. 165,101, filed Dec. 10, 1993, now abandoned.

BACKGROUND OF THE INVENTION

1. Field of the Invention

The present invention relates to polymer particles with a narrow particle size distribution, which can be employed as spacers for use in electronic appliances, a filler for use in a high functional separation column, a molding material, a coating material, and microspheres having active surfaces for use in antigen-antibody reactions, and to a method of producing the polymer particles, and also to a toner for use in electrophotography comprising the polymer particles.

2. Discussion of Background

As the inventors of the present invention have disclosed in Japanese Laid-Open Patent Application 61-19602, polymer particles with a narrow particle size distribution in the range of 1 to 20 μm can be obtained under particular conditions by a polymerization method of polymerizing a vinyl monomer in a hydrophilic organic liquid.

Based on this polymerization method, many trials have been made for changing the composition and physical properties of the surface of polymer particles by using a different kind of polymer stabilizing agent or by providing chemical modifications to the surface of the polymer particles.

However, polymer particles obtained by this polymerization method are substantially spherical and trials for changing the shape of the polymer particles by using this polymerization method have not been made.

With respect to the field of toners for use in electrophotography, a toner comprising such spherical polymer particles with a small particle diameter and a narrow particle size distribution is suitable for high quality digital latent electrostatic images because the toner provides high quality images. However because the polymer particles employed in the toner have a small particle size and are spherical, the cleaning performance, image transfer performance and chargeability of the toner, in particular, the chargeability at high humidities, are so poor that such a toner has not been employed in practice.

Japanese Laid-Open Patent Application 61-279864 discloses toner particles with the degree of the distortion from the complete spherical shape of the toner particles being described in terms of the shape factor thereof and with the degree of the unevenness of the surface of the toner particles being limited to a certain value. However, the reference does not mention anything about factors which have significant effects on the characteristics of the toner, such as the particle size distribution of the toner and the composition of the protrusions on the surface of the toner particles.

Japanese Laid-Open Patent Application 1-185653 discloses a toner comprising toner particles which have a relatively narrow particle size distribution and are nearly spherical. However, the toner particles thereof have very small protrusions or substantially crushed protrusions on the surface thereof, so that the height and composition of the protrusions have not been taken into consideration when using the toner particles.

Furthermore, Japanese Laid-Open Patent Applications 1-300264 and 2-187768 describe methods comprising the steps of preparing polymer particles and attaching finely-divided particles to the surface of the polymer particles in order to make the surface of the polymer particles uneven. However, the methods described in the above references have the shortcomings that the finely-divided particles are not completely attached to the surface of the polymer particles, so that some of the finely-divided particles are detached from the surface of the polymer particles, and the finely-divided particles are deformed. Furthermore, it is impossible to attach relatively large particles to the polymer particles by the above methods in order to make the surface of the polymer particles largely uneven.

SUMMARY OF THE INVENTION

It is therefore a first object of the present invention to provide polymer particles with a narrow particle size distribution, which have high fluidity and anti-blocking performance (i.e. non-aggregation), and excellent optical and dyeable characteristics.

A second object of the present invention is to provide a method of producing the above-mentioned polymer particles.

A third object of the present invention is to provide a toner comprising the above-mentioned polymer particles for use in electrophotography, which is capable of providing images with high quality, and has excellent cleaning performance and image transfer performance, and high triboelectric chargeability which is stable regardless of the ambient conditions thereunder.

The first object of the present invention is achieved by polymer particles which are substantially spherical and have protrusions on the surface of each polymer particle, with such a particle size distribution that the volume mean diameter dv thereof is $1 \leq dv \leq 15$ (μm), and the ratio of the volume mean diameter dv to the number mean diameter dn, that is, dv/dn, is $1 \leq dv/dn \leq 1.2$.

The second object of the present invention is achieved by a polymerization method comprising the steps of polymerizing a vinyl monomer in the presence of a polymeric dispersing agent in a hydrophilic organic liquid in which the vinyl monomer is soluble, but in which a polymer formed from the vinyl monomer swells or is substantially insoluble, optionally in the presence of a cross-linking agent and a chain transfer agent, thereby preparing first polymer particles; and continuing the polymerization with the addition thereto of a vinyl monomer which, when polymerized, provides a polymer with a glass transition point higher than that of the first polymer particles, and an anionic monomer or a cationic monomer, thereby producing polymer particles which are substantially spherical and have protrusions on the surface of each polymer particle, with a narrow particle size distribution.

The third object of the present invention is achieved by a toner comprising the above-mentioned polymer particles which are uniformly dyed to the inside thereof.

The third object of the present invention is also achieved by a toner consisting of or comprising polymer particles with protrusions on the surface of each polymer particle, which are substantially spherical, with the ratio of the average height h of the protrusions from the surface of the polymer particles to the average diameter D of the polymer particles which do not include the protrusions, that is, h/D, being 1/50≦h/D≦1/2, and the ratio of the surface area of the polymer particles occupied by the protrusions to the entire surface of the polymer particles being 1/20 or more.

The third object of the present invention is also achieved by a toner consisting of or comprising the above-mentioned polymer particles with protrusions on the surface of each polymer particle, in which the protrusions contain a functional group, and the functional group forms a salt by the reaction with a cationic surfactant or an anionic surfactant.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
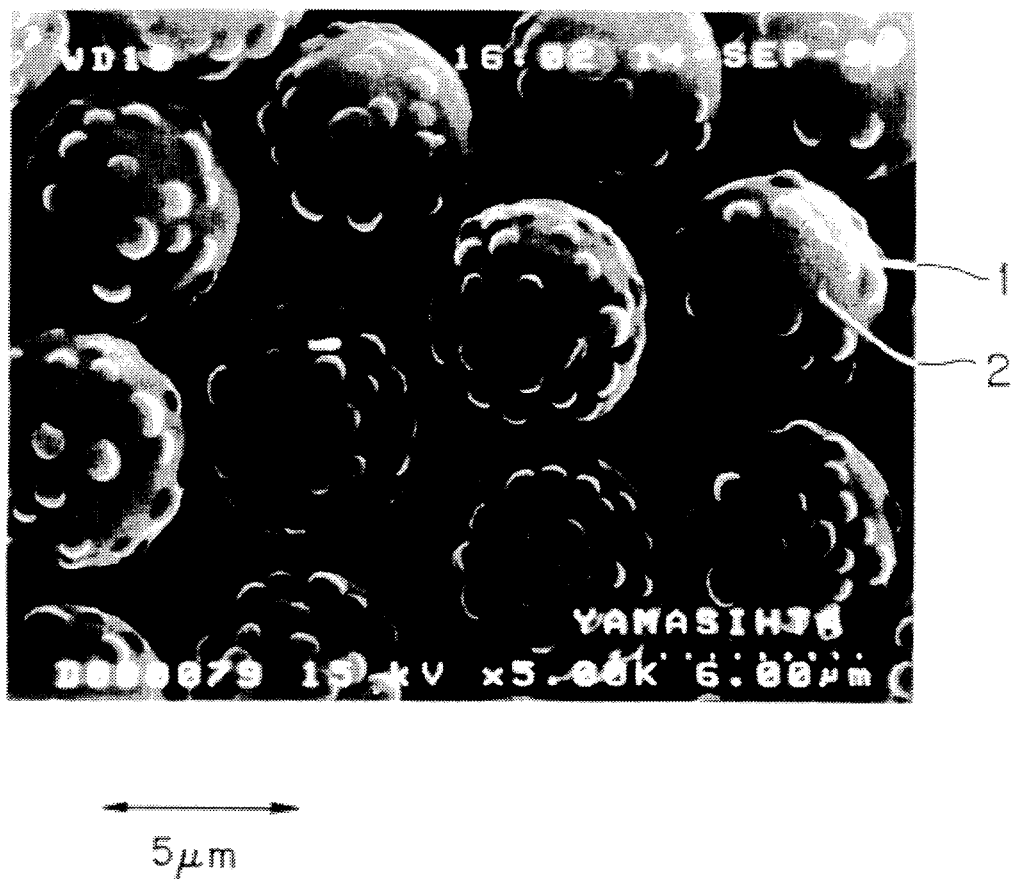
FIG. 1 is a microscopic photograph of a toner prepared in Example 7 taken by a scanning electron microscope.

Polymer particles of the present invention can be obtained, for instance, by the following method:

At least one vinyl monomer A is polymerized in the presence of a polymeric dispersing agent in a hydrophilic organic liquid or in a mixture of a hydrophilic organic liquid and water, in which the vinyl monomer A is soluble, but in which a polymer formed from the vinyl monomer A swells or is substantially insoluble, whereby a polymer is prepared from the vinyl monomer A.

At least one vinyl monomer B, which, when polymerized, provides a polymer with a glass transition point higher than that of the polymer prepared from the vinyl monomer A, and an anionic monomer or a cationic monomer are added to the above polymer and polymerized, whereby polymer particles which are substantially spherical and have protrusions on the surface of each polymer particle are produced. The protrusions formed on the surface of the polymer particles comprise as the main component a copolymer of the vinyl monomer B and the cationic monomer or the anionic monomer.

It is preferable that the vinyl monomer B and the anionic monomer or cationic monomer be added to the system in which the vinyl monomer A is polymerized when the conversion of the vinyl monomer A has reached 70% or more.

Alternatively, the polymer particles with protrusions on the surface thereof can be prepared as follows:

Polymer particles with a smaller particle size and a narrower particle size distribution than the polymer particles to be made are prepared to use as core particles. On the thus prepared core particles, the vinyl monomer A is polymerized to grow a polymer on the surface of the core particles to prepare polymer particles with a narrow particle size distribution. Protrusions can be formed on the thus prepared polymer particles in the same manner as mentioned above.

The core particles can prepared by polymerizing the vinyl monomer A or other monomers, but must be insoluble in the above-mentioned hydrophilic organic liquid.

Polymer particles with a narrow particle size distribution can be prepared from the vinyl monomer A by controlling the polymerization reaction at the initial stage thereof.

The term "narrow particle size distribution" here means such a particle size distribution of particles that the volume mean diameter dv thereof is 1≦dv≦15 (μm), and the ratio of the volume mean diameter dv to the number mean diameter dn thereof, that is, dv/dn, is 1≦dv/dn≦1.20, when measured by Coulter counter made by Coulter Electronics Co., Ltd., using a 100 μm thick aperture tube, in an automatic measurement mode with the measurement conditions such as an aperture current set automatically, for measuring more than 30,000 particles. It is preferable that the value obtained when no particles are incorporated in the counter, which corresponds to the value obtained by noise, be deducted from the value obtained from the above measurement.

In order to use the polymer particles in a toner for use in electrophotography, which is capable of producing high quality images, the volume mean diameter dv thereof must be 15 μm or less, but when the volume mean diameter dv is less than 1 μm, the handling of the polymer particles is extremely difficult because the polymer particles are in the form of dry powder.

A toner comprising the polymer particles which have a particle size distribution as broad as dv/dn>1.20 wherein dv is the volume mean diameter, and dn is the number mean diameter, is not capable of developing digital latent electrostatic images with high quality, and images developed by such a toner are not uniform particularly in the quality of the reproduction of dot images. Furthermore, when such a toner is stored in a development unit, the particle size thereof tends to be changed and the life of the toner tends to be shortened while it is stored.

As mentioned previously, when vinyl monomer A is polymerized, the polymerization is conducted in the presence of a polymeric dispersing agent in a hydrophilic organic liquid or in a mixture of a hydrophilic organic liquid and water, in which the vinyl monomer is soluble, but in which a polymer formed from the vinyl monomer swells or is substantially insoluble, so that as soon as a polymer is formed from the vinyl monomer A, it is separated from the hydrophilic organic liquid. As a result, polymer particles with a narrow particle size distribution are formed.

When the polymerization is initiated, a polymeric dispersing agent serving as a dispersion stabilizer is dissolved in the hydrophilic organic liquid, and the vinyl monomer A is then dissolved in the mixture, with the oxygen in the polymerization system being replaced by an inert gas.

In the above, there are two cases with respect to the timing for the addition of an initiator. In one case, an initiator is added to the polymerization system and the temperature of the polymerization system is thereafter raised to initiate the polymerization. In the other case, the temperature of the polymerization system is raised first, and then an initiator is added to the polymerization system to initiate the polymerization.

In the former case, the polymerization occurs slightly in the presence of the initiator while the oxygen in the polymerization system is being replaced with an inert gas, while in the latter case, it is possible that the vinyl monomer A is polymerized by heat polymerization because of the elevation of the temperature of the polymerization system before the addition of an initiator.

By the above-mentioned initial polymerization, a polymer with a low molecular weight is formed in the form of a liquid, not in the form of particles. The thus formed polymer has an adverse effect on the initial formation of polymer core particles, by which the particle size distribution are broadened or fine polymer particles are formed.

In the above-mentioned first case, in which an initiator is added to the polymerization system and the temperature of the polymerization system is thereafter raised to initiate the polymerization, it is also important to hinder the initiation of the polymerization reaction as much as possible by cooling the polymerization system before the elevation of the temperature of the reaction mixture.

In the above-mentioned second case, in which the temperature of the polymerization system is raised first, and then an initiator is added to the polymerization system to initiate the polymerization, it is important to cool the polymerization system before the elevation of the temperature thereof.

Furthermore, it is desirable that the oxygen contained in the polymerization system be replaced by an inert gas at the initiation of the polymerization. It is preferable that the content of oxygen in the polymerization system be not more than 1.0 vol. %, more preferably not more than 0.1 vol. %. In case the replacement of oxygen by an inert gas is imperfect, a low-molecular weight reaction product formed in a trace amount tends to become fine particles so that the particle size distribution is broadened.

In the above-mentioned first case, the polymerization is initiated when the elevation of the temperature of the polymerization system is started. In the above-mentioned second case, the polymerization is initiated when the initiator is added.

The previously mentioned, initially formed core particles are swollen with a hydrophilic organic liquid or with an unreacted monomer, so that the initial core particles are unstable in many cases. When such core particles aggregate or are combined, the particle size distribution is broadened, so that polymer particles with the desired particle size distribution cannot be obtained.

Therefore, as mentioned previously, core particles may be added to the polymerization system prior to the initiation of the polymerization to control the number of polymer particles to be formed. However, polymer particles can be newly formed in addition to the core particles when a newly formed polymer do not fit with the core particles in terms of the compatibility, polarity, and reactivity thereof.

In the present invention, the initial core particles can be stably formed by controlling the concentration of the vinyl monomer A at the initialization of the polymerization. The number of the core particles formed can also be controlled. For this purpose, it is preferable that the concentration of the vinyl monomer A in the hydrophilic organic liquid at the initiation of the polymerization be such a concentration that 10 parts by weight or less, more preferably 5 parts by weight or less, of the vinyl monomer A, are added to 100 parts by weight of the hydrophilic organic liquid.

In order to cause the core particles to further grow, and to increase the concentration of the polymer particles to be formed, 10 to 100 parts by weight, preferably 20 to 50 parts by weight, of the vinyl monomer A may be further added to 100 parts by weight of the hydrophilic organic liquid.

The vinyl monomer A may be added, either in one lot or in separate lots, to the polymerization system. In order to perform stable polymerization, it is preferable to add the vinyl monomer A in separate lots, with the vinyl monomer A being diluted with the hydrophilic organic liquid to some extent.

In the present invention, the initially formed core particles can be synthesized stably by controlling the polymerization rate at the initiation of the polymerization within a predetermined range.

Stable core particles can be caused to grow by a successive growth reaction, with the particle size distribution maintained. Furthermore, the number mean diameter of the polymer particles can be controlled by controlling the polymerization rate in the initial stage of the polymerization.

The polymerization rate can be controlled by various methods, such as the method of controlling the initial concentration of the vinyl monomer as mentioned previously, a method of controlling the concentration of an initiator employed at the initiation of polymerization, a method of employing an initiator which has a desired decomposition rate at the initiation of polymerization, and a method of controlling the temperature for polymerization to obtain the required decomposition temperature for an initiator. These methods can be used in combination.

When the concentration of an initiator employed at the initiation of polymerization is controlled, it is preferable that the concentration of the initiator be such a concentration that the amount of the initiator is 0.1 parts by weight or less, more preferably 0.05 parts by weight or less, to 100 parts by weight of the vinyl monomer to produce the polymer particles in a stable and reproducible manner.

In order to increase the growth rate of the core particles formed, to proceed with the polymerization reaction to a high degree of polymerization, and also to obtain a polymer with a desired molecular weight, it is required to add an initiator in an amount of 0.1 parts by weight or more to 100 parts by weight of the unreacted vinyl monomer A in the polymerization system in which the core particles have already been formed, thereby causing the polymerization reaction to further proceed.

The initiator employed in the above polymerization may be the same as that employed in the formation of the core particles or may be different from that initiator. A plurality of initiators may also be used in combination.

When a plurality of initiators with different decomposition rates is employed, a polymer with a broad molecular weight distribution can be obtained. Furthermore, in accordance with the degree of the proceeding of the polymerization, initiators may be added in separate lots.

When an initiator to be added is in the form of powder, it is preferable to dissolve the initiator in the hydrophilic organic liquid employed before it is added to the polymerization system.

As an initiator which is used when the conversion of the monomer is below a predetermined range at the initiation of polymerization, an initiator which is decomposed at a relatively high temperature should be used. More specifically, it is preferable to employ an initiator which has a half-life period of 10 hours and a decomposition temperature above 80° C., during a period in which the degree of conversion of the vinyl monomer to a polymer is 10% or less. When core particles are formed in a polymerization system with a relatively small polymerization rate and then the polymerization is moved onto the next polymerization step for forming polymer particles, polymer particles can be formed stably with excellent reproducibility.

In order to increase the growth rate of the core particles formed, to cause the polymerization to proceed to a high degree of polymerization, and to obtain a polymer with a desired molecular weight, it is preferable to employ an initiator having a relatively low decomposition temperature. More specifically, it is preferable to employ an initiator with a half-life period of 10 hours and a decomposition temperature of not more than 80° C. to cause the further polymerization reaction to proceed quickly.

A plurality of initiators with a half-life period of 10 hours and a decomposition temperature of not more than 80° C.

may be used in combination. When a plurality of initiators with different decomposition rates is used, a polymer with a broad molecular weight distribution can be obtained, and also polymer particles with a narrow particle size distribution can be obtained. Furthermore, in accordance with the degree of the proceeding of the polymerization, initiators may be added in separate lots.

When the polymerization is initiated at a required polymerization temperature, it is preferable that the polymerization be conducted at a temperature at which an initiator employed in the polymerization system is provided with a half-life period of 100 hours or more, core particles be formed with a relatively small polymerization rate in a stable manner, and the polymerization be moved onto the next polymerization step for forming polymer particles.

In order to cause the polymerization reaction to proceed quickly, the polymerization temperature may be gradually increased in such a manner that the half-life period of an initiator changes in the range of 100 to 1 hour, or increased quickly when the conversion of the vinyl monomer to a polymer has reached a certain level.

It is preferable that a cross-linking agent be introduced into the polymerization system in a ratio of 3 parts by weight of the cross-linking agent to 100 parts by weight of the vinyl monomer A in a period from the time of the initiation of polymerization through the time when the degree of conversion of the vinyl monomer A to a polymer is low. When the ratio of the amount of a cross-linking agent to the amount of the vinyl monomer A exceeds the above-mentioned ratio, an aggregation tends to be formed in the polymerization system.

In case it is required to add a cross-linking agent further, it is possible to add a cross-linking agent with a ratio of 10 parts by weight or less of the cross-linking agent to 100 parts by weight of the unreacted vinyl monomer A remaining in the polymerization system, when the conversion of the vinyl monomer A to a polymer is increased to a relatively high degree.

As a matter of course, when the previously mentioned growth reaction is conducted on polymer particles having a smaller particle size than that of polymer particles to be finally formed, and a narrower particle size distribution than that of the polymer particles to be finally formed, it is possible to add a cross-linking agent with a ratio of 10 parts by weight or less of the cross-linking agent to 100 parts by weight of the unreacted vinyl monomer A remaining in the polymerization system.

The amount of such a cross-linking agent component can be determined by refluxing polymer particles placed in a filter in a solvent in which the polymer component of the polymer particles is soluble, and obtaining the cross-linking agent component as an insoluble component through a filter, or by dissolving the polymer particles in the above-mentioned solvent with the addition of an auxiliary agent for filtration thereto, filtering or centrifuging the mixture to separate the cross-linking agent component therefrom.

Further, in the present invention, a chain transfer agent can be used together the vinyl monomer A.

A chain transfer agent can be used with a ratio of 0.001 to 3 parts by weight to 100 parts by weight of the vinyl monomer A. In particular, when a chain transfer agent is added to the polymerization system before the initiation of polymerization, the molecular weight of the initially formed polymer can be controlled so that the size of the polymer particles separated can be controlled.

To be more specific, with respect to the core particles which are formed at the initial stage of the polymerization, the solubility and swelling performance thereof within the polymerization system are determined by the molecular weight of the polymer formed, and the molecular weight of the polymer has significant effects on the merging and aggregation of the initially formed core particles. The size of the initially formed core particles depend upon the kind of chain transfer agent employed and the amount of a chain transfer agent used.

When a chain transfer agent is added to the polymerization system after the formation of core particles, the chain transfer agent serves to control the molecular weight of polymer particles to be formed so as to impart the desired viscoelastic characteristics to the polymer particles. When a cross-linking component is added to introduce it into the polymer particles, and a chain transfer agent is also added, it is considered that the chain transfer agent has a surprising effect of imparting excellent dispersing stability on the polymerization system.

It has also been discovered that the amount of a cross-linking agent component employed and the amount of a chain transfer agent employed have a significant effect on the molecular weight and molecular weight distribution of a polymer formed.

It is considered that protrusions which are formed on the surface of the polymer particles as will be discussed in more detail later are produced by the formation of a copolymer from a vinyl monomer B and an ionic monomer, with the copolymer being formed within the polymer particles and coming out toward the surface of the polymer particles. Therefore, it is considered that the formation of the protrusions is significantly influenced by the cross-linking structure of the polymer particles which serve as a matrix body for the protrusions, the viscoelastic properties of the polymer particles, the remaining unreacted vinyl monomer A, the vinyl monomer B, and other ionic monomers as will be discussed later.

In order to form protrusions on the surface of polymer particles prepared from a polymerization system containing the vinyl monomer A, if necessary, with the addition of a cross-linking agent and a chain transfer agent thereto, it is required to produce a polymer which is incompatible with a polymer prepared from the vinyl monomer A as the main component, within the above-mentioned polymer particles or near the surface of the polymer particles.

After various investigations, the inventors of the present invention have discovered that a copolymer of a cationic monomer or an anionic monomer, and a vinyl monomer B which will be mentioned later, is suitable for the incompatible polymer in view of the differences in the compatibility and hydrophilic nature between the two polymers. More specifically, the inventors have discovered that, for the above purpose, it is of great importance that the polymer obtained from the vinyl monomer B have a higher glass transition point than that of a polymer prepared from the vinyl monomer A as the main component, and that it is an indispensable condition for forming protrusions on the surface of polymer particles that a relatively hard polymer with a polarity slightly different from that of a relatively soft polymer is formed from within the soft polymer, with the above-mentioned condition being met.

As a matter of fact, for the formation of the protrusions on the surface of the polymer particles, in addition to the above-mentioned indispensable conditions, it is required to select appropriate conditions for the degree of cross-linking of the polymer prepared from the vinyl monomer A as the main component, the molecular weight and molecular weight distribution of the polymer particles, the swelling of the polymer particles in a hydrophilic organic liquid, the vinyl monomer B, the temperature for the polymerization, and the solubility of an initiator.

To be more specific, the vinyl monomer B and an anionic monomer or a cationic monomer may be added to the polymerization system when the conversion of the vinyl monomer A to a polymer is increased to a certain extent and the growth of the polymer particles slows down. In this case, it is desirable that the vinyl monomer B and an anionic monomer or a cationic monomer be diluted with a hydrophilic organic liquid in order to prevent the aggregation of the polymer particles and to maintain the stability of the polymerization system. Furthermore, in this case, the hydrophilic organic liquid employed for the above-mentioned dilution may be, either the same hydrophilic organic liquid as employed in the formation of polymer particles by the polymerization of the vinyl monomer A, or different from that. The incompatibility of the polymer for the protrusions, which are formed near the surface of the polymer particles, and the size, number and shape of the protrusions can be adjusted by utilizing the magnitude of the polarity of the hydrophilic organic liquid employed for the dilution.

When necessary, the diluted vinyl monomer B and the ionic monomer can be added either in one lot or in separate lots, or can be added gradually, to the polymerization system, whereby the stability of the polymerization system and the properties of the protrusions can be controlled.

Furthermore, by setting the temperature of the polymerization system when the vinyl monomer B and the ionic monomer are added thereto at a temperature different from the temperature at which the vinyl monomer A is polymerized, the swelling properties of the polymer particles prepared from the monomer A as the main component can be changed, whereby the properties of the protrusions can also be controlled.

In order to improve the stability of the polymerization system, polymeric dispersing agents, surfactants, finely-divided inorganic particles, pigments, and water-soluble inorganic compounds may be added to the polymerization system when the diluted vinyl monomer and anionic monomer or cationic monomer are added thereto.

In order to cause the polymerization reaction to proceed smoothly, it is desirable to add an initiator. The initiator may be the same initiator as employed in the polymerization of the vinyl monomer A or different from the initiator.

In many cases, the thus formed protrusions are in the shape of part of a substantial sphere or oval with a minimized surface energy. In particular, when the polymer particles with such protrusions on the surface thereof are used in a toner for use in electrophotography, it is preferable that the polymer particles have protrusions in the above-mentioned shape on the surface thereof, and the ratio of the average height h of the protrusions from the surface of the polymer particles to the average diameter D of the polymer particles which do not include the protrusions, that is, h/D, be $1/50 \leq h/D \leq 1/2$, and more preferably the ratio of the surface area of the polymer particles occupied by the protrusions to the entire surface of the polymer particles be 1/20 or more.

In the case of a toner comprising polymer particles with $h/D < 1/50$, which are extremely close to spherical particles, the fluidity thereof is good, but the toner particles considerably aggregate when reserved at high temperatures, and have poor triboelectric chargeability. Furthermore, when a toner comprising such polymer particles is used in practice, a large amount of toner remains on a photoconductor when toner images are transferred from the photoconductor to a transfer sheet, so that it is extremely difficult to remove the remaining toner from the surface of the photoconductor in a cleaning step, particularly by using a cleaning blade.

In contrast, in the case of a toner comprising polymer particles with $h/D > 1/2$, the toner have the same characteristics as those of a conventional dry toner. However, the toner comprising the above polymer particles are poor in the characteristics required for toner prepared by a conventional crushing method, such as fluidity, and image transfer performance. Furthermore, the toner has the shortcomings that it is pulverized by force generated within a development unit, and the particle size distribution is changed, and accordingly the characteristics of the toner are changed.

The average height h of the protrusions from the surface of the polymer particles is the average length of the perpendicular from the tips of the protrusions to the outer surface of the spherical polymer particles, directed to the center thereof, and the ratio of the surface area of the polymer particles occupied by the protrusions to the entire surface of the polymer particles is expressed by the ratio of the total area of the bottoms of the protrusions on the surface of the spherical polymer particles, which bottoms are substantially circular or oval, to the entire surface area of the polymer particles, which is supposed not to have such protrusions on the surface thereof, in a microscopic photograph taken by a scanning electron microscope.

A toner for use in electrophotography comprising polymer particles having such a shape exhibits high fluidity with excellent replenishment performance in a practical electrophotographic copying machine. Further, such a toner has excellent anti-blocking performance so that the toner particles thereof do not aggregate when preserved at high temperatures, and exhibits excellent triboelectric chargeability even when stirred for an extended period of time and preserved at high temperatures and humidities. Furthermore, the toner has excellent image transfer performance, and the amount of the toner which remains on the surface of a photo-conductor after image transfer is extremely small, so that the cleaning performance thereof is extraordinarily good. Such cleaning performance cannot be obtained by a conventional toner comprising spherical toner particles.

The formation of the protrusions of a copolymer can be confirmed by preparing an ultra-thin plate sample of the obtained polymer particles with a thickness of about several hundreds Å, for instance, by use of a glass knife or a diamond knife, and if necessary, by dyeing the ultra-thin plate sample, for instance, with osmium tetroxide, and by inspecting the differences of the contrast of the protrusions in the ultra-thin plate sample by a transmission type electron microscope.

In addition to the above, the formation of the protrusions can be confirmed by surface analysis methods, using, for instance, an infrared microscope for FTIR, Raman spectrum, X-ray photoelectron spectroscopy (XPS), secondary ion mass spectroscopy (SIMS), and scanning transmission type electron microscope (STEM).

Examples of a hydrophilic organic liquid which is used when preparing a polymer which is made from the vinyl monomer A as the main component, and for preparing a copolymer which is used for forming the protrusions made from the vinyl monomer B, and an anionic monomer or a cationic monomer, are as follows: alcohols such as methyl alcohol, ethyl alcohol, modified ethyl alcohol, isopropyl alcohol, n-butyl alcohol, isobutyl alcohol, t-butyl alcohol, s-butyl alcohol, t-amyl alcohol, 3-pentanol, octyl alcohol, benzyl alcohol, cyclohexanol, furfuryl alcohol, tetrahydrofurfuryl alcohol, ethylene glycol, glycerin, and diethylene glycol; and ether alcohols such as methyl cellosolve, cellosolve, isopropyl cellosolve, butyl cellosolve, ethylene glycol monomethyl ether, ethylene glycol monoethyl ether, diethylene glycol monomethyl ether, and diethylene glycol monoethyl ether. These organic liquids can be used alone or in combination.

Organic liquids other than the above-mentioned alcohols and ether alcohols can be used in combination with the above-mentioned alcohols and ether alcohols, whereby the polymerization conditions can be adjusted by changing the solubility parameter (SP) value of the employed hydrophilic organic liquid under the conditions that the formed polymer particles are insoluble in the organic liquids, so that the particle size of the polymer particles formed can be controlled, and the formation of new polymer particles can be hindered.

Examples of the organic liquids to be used in combination with the above-mentioned alcohols and ether alcohols are hydrocarbons such as hexane, octane, petroleum ether, cyclohexane, benzene, toluene and xylene; halogenated hydrocarbons such as carbon tetrachloride, trichloroethylene, and tertrabromoethane; ethers such as ethyl ether, dimethyl glycol, trioxane, and tetrahydrofuran; acetals such as methylal, and diethyl acetal; ketones such as acetone, methyl ethyl ketone, methyl isobutyl ketone, and cyclohexane; esters such as butyl formate, butyl acetate, ethyl propionate, and cellosolve acetate; acids such as formic acid, acetic acid and propionic acid; sulfur- or nitrogen-containing organic compounds such as nitropropene, nitrobenzene, dimethylamine, monoethanolamine, pyridine, dimethyl sulfoxide, and dimethylformamide; and water.

The polymerization may be conducted in a solvent comprising any of the above-mentioned hydrophilic liquids as the main component in the presence of any of the following ions:

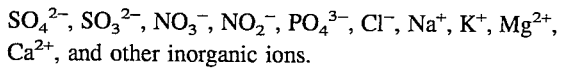

$Ca^{2+}$, and other inorganic ions.

Furthermore, when a vinyl monomer with a relatively large polarity and a solvent or a mixed solvent with a SP value which is far from that of the vinyl monomer are employed at the initial stage of the polymerization, that is, at the stage of forming core particles, the core particles separated have a small particle size, and by adding another solvent thereto, the merging of the core particles can be promoted, whereby the particle size and the particle size distribution can be adjusted.

Furthermore, the average particle size, the particle size distribution of the formed polymer particles, and the properties of the protrusions can be changed by changing the kind of mixed solvent employed and the composition thereof at the initiation of polymerization, during the polymerization reaction, at the formation of the protrusions, and at the final stage of the polymerization.

Examples of a polymeric dispersing agent which is used for preparing a polymer which is made from the vinyl monomer A as the main component, and which is also used for forming the protrusions which are made from the vinyl monomer B, and an anionic monomer or a cationic monomer are as follows: (1) homopolymers and/or copolymers of (a) acids such as acrylic acid, methacrylic acid, α-cyanoacrylic acid, α-cyanomethacrylic acid, itaconic acid, crotonic acid, fumaric acid, maleic acid and maleic anhydride; (b) hydroxyl-group-containing acrylic monomers such as β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethylene glycol monoacrylic ester, diethylene glycol monomethacrylic ester, glycerin monoacrylic ester, glycerin mono-methacrylic ester, N-methylolacrylamide, N-methylol methacrylamide; (c) vinyl alcohols and ethers of vinyl alcohols such as vinyl methyl ether, vinyl ethyl ether, vinyl propyl ether; (d) esters of vinyl alcohols and carboxyl-group-containing compounds such as vinyl acetate, vinyl propionate, and vinyl butyrate; (e) acrylamide, methacrylamide, diacetone acrylamide, and methylol compounds thereof; (f) acid chlorides such as acrylic acid chloride, and methacrylic acid chloride; and (g) nitrogen-containing or nitrogen-containing heterocyclic-group-containing compounds such as vinyl pyridine, vinyl pyrrolidone, vinyl imidazole, and ethyleneimine; (2) polyoxyethylene compounds such as polyoxyethylene, polyoxypropylene, polyoxyethylene alkyl amine, polyoxypropylene alkyl amine, polyoxyethylene alkyl amide, polyoxypropylene alkyl amide, polyoxyethylene nonyl phenyl ether, polyoxyethylene lauryl phenyl ether, polyoxyethylene stearyl phenyl ester, polyoxyethylene nonyl phenyl ester; (3) cellulose derivatives such as methyl cellulose, hydroxyethyl cellulose, and hydroxypropyl cellulose; and (4) copolymers of any of the above-mentioned hydrophilic monomers, and a phenyl-group-containing monomer such as styrene, α-methylstyrene, and vinyltoluene, and derivatives thereof, or acrylic acid derivatives or methacrylic acid derivatives such as acrylonitrile, methacrylonitrile, and acrylamide.

An appropriate polymeric dispersing agent can be selected from these polymeric dispersing agents in accordance with a hydrophilic organic liquid employed, and also in accordance with the timing for producing polymer particles made from the vinyl monomer A as the main component, or for producing protrusions on the surface of the polymer particles. However, an appropriate polymeric dispersing agent is selected particularly from the viewpoints of the necessity for high affinity for the surface of polymeric particles and high adsorption properties thereto and also for high affinity for the hydrophilic organic liquid and high solubility therein in order to sterically prevent the merging of the polymeric particles.

Furthermore, a polymeric dispersing agent with a molecular chain with an appropriate length, preferably having a molecular weight of 10,000 or more, is employed in order to enhance the steric repulsion among the polymer particles. However, when the molecular weight of a polymeric dispersing agent is excessively high, the viscosity of the polymeric dispersing agent is too high to handle and to stir, and the polymeric dispersing agent cannot always be present uniformly on the surface of the polymer particles formed. Therefore care must be taken not to use such a polymeric dispersing agent.

It is also effective for stabilizing the polymer particles to have any of the above-mentioned monomers for producing the polymeric dispersing agents coexist with the vinyl monomers for producing the polymer particles in the polymerization system.

For stabilizing the polymer particles and for obtaining an appropriate particle size distribution efficiently, it is also effective to use any of the following materials: finely-divided particles, preferably with a particle size of 1 μm or less, of metals such as cobalt, iron, nickel, aluminum, copper, tin, lead, and magnesium, and alloys of these metals; finely-divided particles of anionic surfactants such as higher alcohol sulfuric esters, alkylbenzene sulfonates, α-olefinic sulfonates, and phosphoric esters; cation surfactants of an amine salt type such as alkylamine salts, aminoalcohol fatty acid derivatives, polyamine fatty acid derivatives; cationic surfactants of a quaternary ammonium salt type such as alkyltrimethy ammonium salts, dialkyldimethyl ammonium salts, alkyldimethylbenzyl ammonium salts; non-ionic surfactants such as fatty acid amide derivatives, and polyhydric alcohol derivatives; and ampholytic surfactants of an amino acid type, such as alanine type [dodecyldi(aminoethyl)glycine and di(octylaminoethyl)glycine, and ampholytic surfactants of a betaine type.

Generally, the amount of the polymeric dispersing agent to be employed differs depending upon the kind of polymerizable monomer for synthesizing polymer particles. However, it is preferable that the amount of the polymeric dispersing agent be 0.1 to 10 parts by weight, more preferably 1 to 5 parts by weight, to 100 parts by weight of the hydrophilic organic liquid. When the concentration of the polymeric dispersing agent in the hydrophilic organic liquid is low, polymer particles with a relatively large particle size can be obtained, while when the concentration of the polymeric dispersing agent is high, polymer particles with a relatively small particle size can be obtained. However, even if the concentration of the polymeric dispersing agent exceeds 10 parts by weight to 100 parts by weight of the hydrophilic organic liquid, it does not have much effect on the reduction of the particle size of the polymer particles to be formed.

The above-mentioned polymeric dispersing agents, and optionally, the finely-divided particles of inorganic materials, pigments, and surfactants mentioned above, are necessary for the production of polymer particles made from the vinyl monomer A as the main component. These agents may also be used when producing the protrusions by polymerization by adding them to a solution of the vinyl monomer B, and an anionic or cationic monomer, in order to prevent the merging of the protrusions formed on the surface of the polymer particles.

The core particles formed at the initial stage of polymerization are stabilized by the polymeric dispersing agent which is distributed to the hydrophilic organic liquid and to the surface of the polymer particles, and is in equilibrium with them. However, when a large amount of unreacted vinyl monomer A is present in the hydrophilic organic liquid, the core particles are swollen to some extent by the unreacted vinyl monomer A and becomes adhesive. As a result, the core particles overcome the steric repulsion generated by the polymeric dispersing agent and aggregate.

When an extremely large amount of the vinyl monomer A is present in comparison with the amount of the hydrophilic organic liquid, the polymer formed is completely dissolved in the vinyl monomer A, so that the polymer formed does not separate out before the polymerization proceeds to some extent. In this case, the separated polymer is in the form of an adhesive lump. As a matter of course, there is some limitation on the amount of the vinyl monomer A relative to the amount of the hydrophilic organic liquid. The relative amount of the vinyl monomer A may differ, depending upon the kind of the hydrophilic organic liquid, but generally it is preferable that the amount of the vinyl monomer A be not more than about 100 parts by weight, more preferably not more than 50 parts by weight, to 100 parts by weight of the hydrophilic organic liquid.

The vinyl monomer A for use in the present invention is soluble in the hydrophilic organic liquid. Specific examples of the vinyl monomer A are as follows: styrene, and styrene derivatives such as o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene and 3,4-dichlorostyrene; s-methyl fatty acid monocarboxylic ester such as methyl acrylate, ethyl acrylate, n-butyl acrylate, isobutyl acrylate, propyl acrylate, n-octyl acrylate, dodecyl acrylate, lauryl acrylate, 2-ethylhexyl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, lauryl methacrylate, 2-ethylhexyl methacrylate, stearyl methacrylate, phenyl methacrylate, dimethylaminoethyl methacrylate and diethylaminoethyl methacrylate; derivatives of acrylic acid and methacrylic acid such as acrylonitrile, methacrylonitrile, and acrylamide; and halogenated vinyl compounds such as vinyl chloride, vinylidene chloride, vinyl bromide, and vinyl fluoride. These monomers may be used alone or in combination. Furthermore, as the vinyl monomer A for use in the present invention, a mixture of any of the above-mentioned monomers in an amount of 50 wt. % or more, and one or more other monomers which can be copolymerized with the aforementioned monomer.

As a cross-linking component for use in the polymer particles, cross-linking agents with two or more polymerizable double bonds are employed.

It is preferable that the amount of the cross-linking agent to be added be not more than 3 parts by weight, more preferably not more than 1.5 parts by weight, to 100 parts by weight of the vinyl monomer A in the period from the initiation of polymerization thorough the moment the conversion of the vinyl monomer A reaches 10%.

When the degree of polymerization conversion of the vinyl monomer A exceeds 10%, if necessary, it is preferable that the amount of the cross-linking agent to be added be not more than 10 parts by weight to 100 parts by weight of the remaining vinyl monomer A. The cross-linking agent may be added in one lot or in lots. It is preferable that the cross-linking agent be added in lots in accordance with the degree of the proceeding of polymerization.

The previously mentioned cross-linking agents can be used together with the vinyl monomer B, and an anionic or cationic monomer when forming the protrusions on the surface of the polymer particles, whereby the formation of the protrusions can be promoted and protrusions made of a cross-linked polymer can be formed.

The concentration of the cross-linking agent at the initial stage of polymerization must be controlled below a certain level. This is because if the concentration of the cross-linking agent is above a certain level when the initial core particles are being separated at the initial stage of polymerization, or when the polymeric dispersing agent is stably absorbed on the particles, cross-linking structures are formed among the core particles, so that the stabilization of the core particles is extremely hindered.

Once the core particles are stabilized, the successive steps of the growth reaction on the surface of the core particles to form polymer particles, which is carried out by the swelling of the core particles in the vinyl monomer A, and the polymerization of the vinyl monomer A on the surface of the core particles, and the formation of protrusions on the surface of the polymer particles, proceed smoothly without being hindered by the cross-linking agent.

Examples of the cross-linking agent, which are preferably employed in the present invention, are as follows: aromatic divinyl compounds such as divinyl-benzene, divinyl naphthalene, and derivatives thereof; carboxylic acid esters such as ethylene glycol diacrylate, ethylene glycol dimethacrylate, triethylene glycol diemthacrylate, tetraethylene glycol diemthacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, and 1,1,1-trishydroxymethylethane diacrylate; and all divinyl compounds and compounds having three or more vinyl groups such as N,N-divinyl-aniline, divinyl ether, divinylsulfide, divinylsulfone. These crosslinking agents can be used alone or in combination.

There is no particular limitation on the chain transfer agent for use in the present invention. However, the so-called polymerization retarders and polymerization inhibitors, which reduce not only the molecular weight of the polymer particles to be formed, but also the polymerization rate thereof, cannot be used in the present invention.

Examples of the chain transfer agent, which are preferably employed in the present invention, are as follows: halogenated hydrocarbons such as carbon tetrachloride, carbon tetrabromide, ethyl acetate dibromide, ethyl acetate tribromide, ethylbenzene dibromide, ethane dibromide and ethane dichloride; diazothioether; hydrocarbons such as benzene, ethylbenzene and isopropylbenzene; alkylmercaptans such as tertiary dedocylmercaptan and n-dodecylmercapatan; thioalcohols such as mercaptoethanol and mercaptopropanol; disufides such as diisopropylxanthogenedisulfide, dimethylsulfide and diethylsulfide; pentaerythritol tetrathioglycolate, octyl thiopropionate, thioglycollic acid, and esters thereof; thioglycerin; thioaldehydes such as thioethylaldehyde, thiopropylaidehyde, thiooctylaldehyde and thiododecyl-aldehyde; azobenezene derivatives; naphthalene derivatives; and nuclear-substituted aromatic compounds.

As the vinyl monomer B for forming protrusions, one or more monomers can be selected from the previously mentioned vinyl monomer A and monomers for forming the previously mentioned polymeric dispersing agent, although the vinyl monomer B is not limited to the above monomers.

However, when a vinyl monomer with a relatively high polarity is selected as the vinyl monomer B, it is preferable to use the vinyl monomer in combination with a vinyl monomer with a relatively low parity in order that the formed polymer be not dissolved in the hydrophilic organic liquid.

Further, it is required that the vinyl monomer B, when polymerized, provide a polymer having a higher glass transition point than that of a polymer obtained by polymerizing the vinyl monomer A as the main component. Specific data for the glass transition points of such polymers are shown, for instance, in "Polymer Handbook" 3rd Edition Section VI, P 209 (A Willy Inter Science Publication).

Examples of an anionic vinyl monomer which is used in combination with the vinyl monomer B for forming the protrusions include an unsaturated carboxylic acid monomer, an unsaturated sulfonic acid monomer, and an unsaturated phosphoric acid monomer.

Specific examples of the unsaturated carboxylic acid monomer are acrylic acid, methacrylic acid, crotonic acid, itaconic acid, and maleic acid; half esters such as monobutyl itaconic ester, monomethyl maleic ester, monobutyl maleic ester and monooctyl maleic ester; fumaric acid, citraconic acid, cinnamic acid, butene tricarbonic acid, 3-butenoic acid, 4-pentenoic acid, tetrahydroterephthalic acid; and anhydrides of dibasic acids such as maleic anhydride, itaconic anhydride.

Specific examples of the unsaturated sulfonic monomer are styrene sulfonic acid, 2-acrylamido-2-methylpropanesulfonic acid, 3-sulfopropylmethacrylic ester, 3-sulfopropylacrylic ester, bis-(3-sulfopropyl)itaconic ester, sulfuric monoester of 2-hydroxyethylmethacrylic acid, sulfuric monoester of 2-hydroxyethylacrylic acid, allylsulfosuccinic acid, octyl allylsulfosuccinate, vinylsulfonic acid, 2-sulfoethylmethacrylate, 2-sulfoethylacrylate, and salts thereof.

Specific example of the unsaturated phosphoric acid monomer are as follows:

vinylphosphonic acid,
vinylphosphate,
acid phosphoxyethylmethacrylate,
acid phosphoxyethylacrylate,
3-chloro-2-acid phosphoxypropylmethacrylate,
3-chloro-2-acid phosphoxypropylacrylate,
acid phosphoxypropylmethacrylate,
acid phosphoxypropylacrylate,
bis(methacryloxyethyl)phosphate,
diphenyl-2-acryloyloxyethylphosphate,
diphenyl-2-methacryloyloxyethylphosphate,
dibutyl-2-methacryloyloxyethylphophate,
dibutyl-2-acryloyloxyethylphosphate,
dioctyl-2-methacryloyloxyethylphosphate,
dioctyl-2-acryloyloxyethylphosphate, and
mono-(2-methacryloyloxyethyl) acid phosphate.

Examples of a cationic vinyl monomer which is used in combination with the vinyl monomer B for forming the protrusions include a (meth)acrylate of an aliphatic alcohol including an amino group or an alkyl group; (meth)acrylamide; (meth)acrylate and (meth)acrylamide with the nitrogen atom being substituted with a mono- or di-alkyl-group; vinyl compounds substituted with a heterocyclic group including a nitrogen atom in the heterocyclic group; N,N-diallylalkylamine; styrene derivatives having a mono- or di-alkyl group; vinyl ethers having a mono- or di-alkylamino group; and compounds prepared by making the above amine compounds quaternary compounds.

Examples of the (meth)acrylate of an aliphatic alcohol including an amino group or an alkyl group are as follows:

N,N-dimethylaminoethyl(meth)acrylate,
N,N-diethylaminoethyl(meth)acrylate,
3-dimethylaminophenyl(meth)acrylate,
N,N-dimethylaminopropyl(meth)acrylate,
N,N-diethylaminopropyl(meth)acrylate, and
N-methylaminoethyl(meth)acrylate.

Examples of the (meth)acrylate and (meth)acrylamide with the nitrogen atom being substituted with a mono- or di-alkyl-group are as follows:

acrylamide,
N-butylacrylamide,
N,N-dibutylacrylamide,
piperidine acrylamide,
N-(N',N'-dimethylamidoethyl)acrylamide,
N-(N',N'-dimethylaminoethyl)methacrylamide,
methacrylamide,
N-butylmethacrylamide, N,N-dimethylacrylamide, N-octadecylacrylamide, N-(N',N'-diethylaminoethyl)acrylamide, N-(N',N'-diethylaminoethyl)methacrylamide, N-(N',N'-dimethylaminopropyl)acrylamide, N-(N',N'-dimethylaminopropyl)methacrylamide, N-(N',N'-diethylaminopropyl)acrylamide, N-(N',N'-diethylaminopropyl)methacrylamide, diacetone acrylamide, N-hydroxymethylacrylamide, N-methylaminoethylacrylamide, and N-methylaminomethacrylamide.

Examples of the vinyl compounds substituted with a heterocyclic group containing a nitrogen atom in the heterocyclic group include vinylpyridine, vinylpyrrolidone, 2-methyl-5-vinylpyridine and 2-ethyl-5-vinylpyridine.

Examples of the N,N-diallylalkylamine include N,N-diallylmethylamine, and N,N-allylethylamine.

Examples of the styrene derivatives having a mono- or di-alkyl group include N,N-dimethylaminomethyl styrene, N,N-dimethylaminoethyl styrene and N,N-diethylaminoethyl styrene.

Examples of the vinyl ethers having a mono- or di-alkylamino group include 2-dimethyaminoethyl vinyl ether, and 2-diethylaminoethyl vinyl ether.

Furthermore, compounds prepared by making the above-mentioned compounds quaternary compounds can also be used. Examples of an agent for making the compounds quaternary compounds include the following conventional agents: a dialkyl sulfate with the number of carbon atoms in the alkyl group being 4 or less, an alkyl sulfonate of an alkylsulfonic acid or an arylsufonic acid, with the number of carbon atoms in the alkyl group being not more than 18, such as methanesulfonic acid, benzenesulfonic acid, and toluenesulfonic acid; a compound having a halogenated benzyl group such as benzyl chloride, and benzyl bromide; and a compound having a halogenated alkyl group with not more than 18 carbon atoms.

An ampho-ionic monomer having cationic and anionic properties can also be used in combination with the vinyl monomer B for forming the protrusions on the surface of the polymer particles. Examples of the ampho-ionic monomer include the following:

N,N-dimethyl-N-methacryloxyethyl-N-(3-sulfo)propyl-ammoniumbetaine,

N,N-dimethyl-N-methacrylamidopropyl-N-(3-sulfopropyl)-ammoniumbetaine, 1-(3-sulfopropyl)-2-vinylpyridiniumbetaine, N-(vinylbenzyl)taurine, N-methyl-N-(vinylbenzyl)taurine, N-(isopropenylbenzyl)taurine, N-(2-hydroxy-3-alloxypropyl)taurine, 2-[N-(2-hydroxy-3-alloxypropyl)]taurine, and N-(2-hydroxy-3-alloxypropyl)alanine.

These anionic or cationic vinyl monomers can be added together with the vinyl monomer B to the polymerization system when the conversion of the vinyl monomer A has increased to some extent and polymer particles have been formed, so that the growth of the particle size has slowed down, preferably when the conversion of the vinyl monomer A has reached 70% or more.

However, it is not always necessary to add the anionic or cationic monomer together with the vinyl monomer B to the polymerization system. The anionic or cationic monomer may be added either before or after the addition of the vinyl monomer B. Furthermore, the anionic or cationic monomer may be added in one lot or in lots.

A copolymer synthesized from the vinyl monomer B and the anionic or cation monomer as the main components has a relatively large polarity, so that in order to prevent the synthesized copolymer from being dissolved in the hydrophilic organic liquid, the amount of the anionic or cationic monomer is determined in accordance with the kind of the vinyl monomer B and the amount of the vinyl monomer B employed. Preferably 1 to 30 parts by weight of the anionic or cationic monomer is employed for 100 parts by weight of the vinyl monomer B. The amount of the anionic or cationic monomer may of course be changed from the above range when necessary.

Examples of an initiator usually used for the polymerization of the vinyl monomer A, the vinyl monomer B, and the anionic or cationic monomer include peroxides such as benzoyl peroxide, lauryl peroxide, di-t-butylperoxide, cumenehydroperoxide, t-butyl-peroctoate, t-butylperoxy-2-ethylhexanoate; and azo compounds such as azobisisobutyronitrile, 2,2-azobis(2,4-dimethylvaleronitrile), 2,2'-azobis(4-methoxy-2,4-dimethylvaleronitrile), and dimethyl-2,2'-azobisisobutylate.

Examples of an initiator having a relatively large polarity include amidine derivatives such as 2,2'-azobis (2-amidinopropane)dihydrochloride, 2,2'-azobis-(N,N'-dimethyleneisobutylamidine), 2,2'-azobis(N,N-dimethyleneisobutylamidine)dihydrochloride. These compounds may be used in the form of an aqueous solution. In addition, initiators such as carboxylic-acid-containing azo compounds, for example, 4,4'-azobis(4-cyanopentanoic acid); persulfate-based initiators such as potassium perfulfate, and ammonium perfulfate; and initiators comprising any of the above initiators and sodium thiosulfate or amine may be used. The above-mentioned initiators can be used alone or in combination.

Examples of a peroxide-based initiator with a half-life period of 10 hours above 80° C., which belong to a group of initiators having relatively high decomposition temperatures and are used during the period in which core particles are formed and stabilized at the initial stage of polymerization are as follows:

1,1-bis(t-butylperoxy)cyclohexane, t-butylperoxylaurate, cyclohexanoneperoxide, t-butylperoxyisopropylcarbonate, 2,2'-bis(t-butylperoxy)octane, 2,2'-bis(t-butylperoxy)butane, n-butyl-4,4'bis(t-butylperoxy)octane, 2,2'-bis(t-butylperoxy)butane, n-butyl-4,4'-bis(t-butylperoxy)valerate, methyl ethyl ketone peroxide, dicumylperoxide, 2,5-dimethyl-2,5-di(t-butylperoxy)hexane, t-butylcumylperoxide, di-t-butylperoxide, 2,5-dimethyl-2,5-di(t-butylperoxy)hexane, 2,5-dimethylhexane-2,5-dihydroperoxide, cumene hydroperoxide, and t-butyl hydroperoxide.

Examples of an azo initiator with a half-life period of 10 hours above 80° C. are as follows:

1,1'-azobis(cyclohexane-1-carbonitrile),

1-{(1-cyano-1-methylethyl)azo}formamide,
2-phenylazo-4-methoxy-2,4-dimethylvaleronitrile,
2,2'-azobis{2-methyl-N-(1,1-bis(hydroxymethyl)ethyl}propionamide,
2,2'-azobis{2-methyl-N-(2-hydroxyethyl)-propionamide},
2,2'-azobis(2-methylpropionamido)dihydrate,
2,2'-azobis(2,4,4-trimethylpentane), and
2,2'-azobis(2-methylpropane).

Examples of a peroxide-based initiator with a half-life period of 10 hours at 80° C. or less, which belong to a group of initiators having relatively low decomposition temperatures and are used after the formation of core particles are as follows:

acetylcyclohexyl sulfonylperoxide,
isobutylperoxide,
cumyl peroxineododecanoate,
diisopropyl peroxydicarbonate,
diallyl peroxydicarbonate,
di-n-propyl peroxydicarbonate,
dimyristyl peroxydicarbonate,
cumyl peroxyneohexanate,
di(2-ethoxyethyl)peroxydicarbonate,
di(methoxyisopropyl)peroxydicarbonate,
di(2-ethylhexyl)peroxycarbonate,
t-hexylperoxyneodecanoate,
di(3-methyl-3-methoxybutyl)peroxydicarbonate,
t-butylperoxyneodecanoate,
t-hexylperoxyneohexanoate,
t-butylperoxyneohexanoate,
2,4-dichlorobenzoylperoxide,
t-hexylperoxypivalate,
3,5,5-trimethylhexanoylperoxide,
octanoylperoxide,
decanoylperoxide,
lauroylperoxide,
cumylperoxyloctanoate,
succinic acid peroxide,
acetylperoxide,
t-butylperoxy(2-ethylhexanoate),
m-toluoylperoxide,
benzoylperoxide, and
t-butylperoxyisobutylate.

Examples of an azo initiator with a half-life period of 10 hours at 80° C. or less are as follows:

2,2'-azobis(2-methoxy-2,4-dimethylvaleronitrile),
2,2'-azobis-cyclopropylpropionitrile),
2,2'-azobis-2,4-dimethylvaleronitrile),
2,2'-azobisisobutyronitrile,
2,2'-azobis(2-methylbutyronitrile),
2,2'-azobis(2-methyl-N-phenylpropionamidine)dihydrochloride,
2,2'-azobis{N-(4-chlorophenyl)-2-methylpropionamidine}dihydrochloride,
2,2'-azobis{2-methyl-N-(phenylmethyl)-propionamidine}dihydrochloride,
2,2'-azobis(2-methylpropionamidine)dihydrochloride,
dimethyl-2,2'-azobisisobutylate,
4,4'-azobis(4-cyano valeic acid),
2,2'-azobis{2-(hydroxymethyl)propionitrile},
2,2'-azobis[2-{2-(5-methyl-2-imidazoline-2-yl)}propane]dihydrochloride,
2,2'-azobis{2-(3,4,5,6-tetrahydropyrimidine-2-yl)propane}dihydrochloride,
2,2'-azobis[2-{1-(2-hydroxyethyl)-2-imidazolin-2-yl}propane]dihydrochloride, and
2,2'-azobis[2-methyl-N-{1,1-bis(hydroxymethyl)-2-hydroxyethyl}propionamide].

In addition to the above-mentioned peroxide-based initiators and azo initiators, persulfate-based initiators can be employed if the decomposition temperatures thereof are in a desired range.

If the polymerization rate is controlled by controlling the polymerization temperature in order to form stable core particles at the initial stage of polymerization, and the following initiators are used, it is preferable that the polymerization be conducted at the temperature at which the following initiators provide a half-life period of 10 hours when the conversion of the polymers is 10% or less:

|  | Temperature (°C.) |
|---|---|
| t-hexylperoxyneohexanoate | 32.5 |
| 2,4-dichlorobenzylperoxide | 33.0 |
| t-butylperoxypivalate | 38.0 |
| octanoylperoxide | 45.0 |
| decanoylperoxide | 45.0 |
| lauroylperoxide | 46.0 |
| cumylperoxide | 48.8 |
| m-toluoylperoxide | 56.0 |
| benzoylperoxide | 56.6 |
| t-butylperoxyisobutylate | 61.0 |
| t-butylperoxylaurate | 73.0 |
| t-butylperoxyacetate | 85.0 |
| (In the case of azo initiators) | |
| 2,2-azobis(2-cyclopropylpropionitrile) | 26.5 |
| 2,2'-azobis(2,4-dimethylvaleronitrile) | 37.0 |
| 2,2'-azobisisobutyronitrile | 50.0 |
| 2,2'-azobis(2-methylbutyronitrile) | 52.5 |
| 1,1'-azobis(cyclohexane-1-carbonitrile) | 72.0 |
| 1-{(1-cyano-1-methylethyl)azo}formamide | 86.0 |
| azodi-t-octane | 89.0 |
| 4,4'-azobis(4-cyanopentanic acid) | 53.0 |
| 2,2'-azobis(2-cyanopropanol) | 60.0 |

It is preferable that after the formation of stable core particles, the polymerization be caused to proceed at a temperature above the above-mentioned respective temperatures. The above-mentioned initiators can be employed in amount of 0.1 to 10 parts by weight to 100 parts by weight of the vinyl monomer.

The conditions for the polymerization for producing a copolymer from the vinyl monomer A which is employed as the main component, more specifically, the concentrations and mixing ratios of the polymeric dispersing agent and the vinyl monomer in the hydrophilic organic liquid, are set in accordance with the desired mean particle size, and particle size distribution of the polymer particles to be produced. Generally, the concentration of the polymeric dispersing agent is increased in order to decrease the mean particle size of the polymer particles, and the concentration of the polymeric dispersing agent is decreased in order to increase the mean particle size of the polymer particles.

On the other hand, in order to obtain the polymer particles with a narrow particle size distribution, the polymerization is conducted in a reaction chamber under the conditions that the temperature of the vinyl monomer A is set low, and the reaction mixture is heated to a temperature in accordance with the decomposition temperature of an initiator employed, with the reaction mixture being stirred to produce a uniform flow in the reaction chamber. Since the temperature of the reaction mixture at an initial stage of polymerization has a significant effect on the particle size of the core particles to be formed, it is desirable that the reaction mixture be heated to a polymerization temperature after the monomer is added thereto, and the initiator be added thereto in the form of a solution which is prepared by dissolving the initiator in a small amount of a solvent.

When the polymerization is conducted, it is required that oxygen contained in the atmosphere in the reaction chamber be completely replaced by an inert gas such as nitrogen or argon. If the replacement of the oxygen by such an inert gas is insufficient, polymer particles with an extremely small particle size tend to be formed.

In order to perform the polymerization with high conversion, it is necessary that the polymerization be conducted for 5 to 40 hours. However, the polymerization can be terminated when the desired particle size and particle size distribution are obtained, or the rate of polymerization can be increased by adding an initiator in lots successively, by changing the polarity of a hydrophilic organic liquid employed, or by conducting the polymerization under high pressure.

In the case where dyed polymer particles are obtained after the polymerization, the polymer particles obtained by the above-mentioned polymerization may be directly dyed, or the polymer particles may be subjected to a separation process for removing therefrom unnecessary particles, the remaining monomer, and the polymeric dispersing agent by an operation such as sedimentation, centrifugation, and washing by decantation, to obtain the polymer particles in the form of a polymer slurry, and the polymer slurry is dyed. It is better not to remove the polymeric dispersing agent, since the dyeing system is highly stable, and unnecessary aggregation of the polymer particles can be avoided in the presence of the polymeric dispersing agent.

When the polymer particles obtained by the above-mentioned polymerization are used as dyed polymer particles for a toner for electrophotography, the polymer particles are dyed as follows:

The polymer particles are dispersed in an organic solvent in which the polymer particles are insoluble. Before or after dispersing the polymer particles in the organic solvent, there is dissolved in the above-mentioned solvent a dye with a solubility of $[D_1]$ in the solvent, and a solubility of $[D_2]$ in the polymer of the polymer particles, and with a relationship of $[D_1]/[D_2] \leq 0.5$, preferably with a relationship of $[D_1]/[D_2] \leq 0.2$, whereby the polymer particles are dyed with the dye. Thereafter the solvent is removed from the above mixture. Dyed polymer particles with the dye being diffused or penetrating deeply into the inside thereof can be efficiently produced by the above-mentioned method. The thus obtained dyed polymer particles are hereinafter referred to as the colored particles.

In the above, the respective solubilities $[D_1]$ and $[D_2]$ are to be measured at 25° C., and the solubility $[D_2]$ in the polymer is defined in the same manner as in the case of the solubility of $[D_1]$ in the solvent. Namely, the solubility $[D_2]$ in the polymer means a maximum amount of the dye that can be dissolved in a compatible state in a unit amount of the polymer. The dissolved state or a separated state of the dye in the polymer can be easily identified by a microscope.

The solubility of a dye in a polymer can also be assessed by an indirect method instead of the above-mentioned direct observation of the state of the dye in the polymer. In the indirect method, the dye is dissolved in a solvent in which the polymer is highly soluble, and the solubility of the dye in the solvent is measured. The thus measured solubility of the dye is defined as the solubility of the dye in the polymer.

As the dyes for use in the present invention, any conventional dyes can be employed as long as the above-mentioned solubility relationship can be met. In general, water-soluble dyes such as cationic dyes and anionic dyes are not suitable for use in the present invention because the properties thereof are significantly changeable depending upon the ambient conditions and when they are used in the toner, the resistivity of the toner tends to be decreased and therefore the image transfer ratio tends to be decreased. For this reason, vat dye, disperse dye, and oil-soluble dye are preferable for use in the present invention. Of these dyes, oil-soluble dye is most suitable for use in the present invention. As a matter of course, several dyes can be used in combination for obtaining a desired color tone.

The weight ratio of the dye to the polymer particles to be dyed can be selected as desired, depending upon the desired color tone. However, generally it is preferable that the amount of the dye be in the range of 1 to 50 parts by weight to 100 parts by weight of the polymer particles to be dyed.

In the present invention, when an alcohol having a relatively high value of solubility parameter (hereinafter referred to as SP value), such as methanol and ethanol, is employed as a solvent for dying and a styrene-acrylic resin having a SP value of 9 is used as the material for the polymer particles, for example, the following dyes can be employed:

C.I. Solvent Yellow (6, 9, 17, 31, 35, 100, 102, 103, 105),

C.I. Solvent Orange (2, 7, 13, 14, 66),

C.I. Solvent Red (5, 16, 17, 18, 19, 22, 23, 143, 145, 146, 149, 150, 151, 157, 158), C.I. Solvent Violet (31, 32, 33, 37), C.I. Solvent Blue (22, 63, 78, 83–86, 91, 94, 95, 104), C.I. Solvent Green (24, 25), and C.I. Solvent Brown (3, 9).

In addition, the following commercially available dyes can be employed:

Aizen Sot dyes such as Yellow-1, 3, 4, Orange-1, 2, 3, Scarlet-1, Red-1, 2, 3, Brown-2, Blue-1, 2, Violet-1, Green-1, 2, 3, and Black-1, 4, 6, 8 (made by Hodogaya Chemical Co., Ltd.); Sudan dyes such as Yellow-140, 150, Orange-220, Red-290, 380, 460, and Blue-670 (made by BASF); Diaresin, Yellow-3G, F, H2G, HG, HC, HL, Orange-HS, G, Red-GG, S, HS, A, K, H5B, Violet-D, Blue-J, G, N, K, P, H3G, 4G, Green-C, and Brown-A (made by Mitsubishi Chemical Industries, Ltd.); Oil Color, Yellow-3G, GG-S, #105, Orange-PS, PR, #201, Scarlet-#308, Red-5B, Brown-GR, #416, Green-BG, #502, Blue-BOS, IIN, and Black-HBB, #803, EE, EX (Orient Chemical Industries, Ltd.); Sumiplast Blue GP, OR, Red FB, 3B, and Yellow FL7G, GC (made by Sumitomo Chemical Co., Ltd.); Kayaron, Polyester Black EX-SF300, and Blue A-2R of Kayaset Red-B (made by Nippon Kayaku Co., Ltd.).

The applicable dyes are not limited to the above.

As the organic solvents for dying the polymer particles with any of the above dyes, it is preferable to employ solvents in which the polymer particles are not dissolved, or in which the polymer particles slightly swell with the solvents. More specifically it is preferable to employ organic solvents with a difference between the SP value of the solvents and that of the polymer particles be 1.0 or more, more preferably 2.0 or more, or a mixed solvent of water and an organic solvent. More specifically, it is preferable to employ an alcohol having a high SP value such as methanol, ethanol or n-propanol, or an organic solvent having a low SP value such as n-hexane n-propane in combination with styrene-acrylic resin particles.

However, when the difference in the SP value between the organic solvent and the polymer particles is too large, the wetting of the polymer particles with the solvent is so poor that the polymer particles are not appropriately dispersed in the organic solvent. Therefore, it is preferable that the SP value difference be in the range of 2 to 5.

In the present invention, the dying is carried out, for example, by dispersing the polymer particles in the above-mentioned organic solvent in which an appropriate dye is dissolved, and stirring the dispersion under the conditions that the temperature of the dispersion is kept below the glass transition temperature of the polymer of the polymer particles, whereby the polymer particles can be dyed sufficiently without causing the aggregation of the polymer particles. For stirring the dispersion of the dye and polymer particles, a conventional stirrer such as homomixer or magnetic stirrer can be employed.

Alternatively, the dyed resin particles can be obtained by directly adding the dye to a slurry comprising an organic solvent and polymer particles which are dispersed in the organic solvent, which is obtained, for example, at the completion of the dispersion polymerization process, and stirring the mixture under the above-mentioned conditions.

In any of the above-mentioned processes, when the temperature at which the polymer particles and the dye-containing solvent are mixed and stirred is above the glass transition temperature of the resin particles, there may be the case where the polymer particles aggregate while stirred.

There is no particular limitation on the method of drying a dyed slurry, but it is preferable to remove the remaining dye from the slurry, and the polymer particles be separated from the slurry by filtration and dried under reduced pressure. Alternatively the slurry is directly dried, without the filtration of the polymer particles. In the present invention, the colored particles obtained by drying the slurry under reduced pressure or at room temperature after the separation of the polymer particles by filtration substantially do not aggregate and have substantially the same particle size distribution as that of the polymer particles prior to the dyeing process.

Polymer particles with protrusions on the surface thereof themselves have high fluidity, excellent anti-blocking performance when allowed to stand at high temperature, excellent high-impact properties when molded, high triboelectric properties, low temperature-dependent coefficient of thermal expansion, and excellent optical properties and dyeability. However, the characteristics of the polymer particles can be further improved by treating the polymer particles with a surfactant with a fluoroalkyl group, primarily by forming salts by the reaction of the surfactant with anionic or cationic functional groups which are mainly located in the protrusions formed on the surface of the polymer particles.

Examples of the surfactant with a fluoroalkyl group, which are preferably in the present invention are as follows: fluoroalkylcarboxylic acids with 2 to 10 carbon atoms, and metal salts thereof, di-sodium perfluorooctane sulfonyl glutamate, sodium 3-[fluoroalkyl ($C_8$–$C_{11}$)oxy-1-alkyl ($C_3$–$C_4$) sulfonate, sodium 3-[ω-fluoroalkanolyl ($C_6$–$C_8$)-N-ethylamino-1]-propanesulfonate, fluoroalkyl ($C_{11}$–$C_{20}$) carboxylic acid and metal salts thereof, perfluoro alkyl carboxylic acid ($C_7$–$C_{13}$) and metal salts thereof, perfluoroalkyl ($C_4$–$C_{12}$) sulfonic acid and metal salts thereof, perfluorooctane sulfonic acid diethanolamide, N-propyl-N-(2-hydroxyethyl) perfluorooctane sulfonamide, perfluoroalkyl ($C_6$–$C_{10}$) sulfonamide propyl trimethyl ammonium salt, perfluoroalkyl ($C_8$–$C_{10}$)-N-ethylsulfonly glycine salt, and monoperfluoroaklyl ($C_8$–$C_{16}$) ethyl phosphoric acid ester.

Examples of a commercially available anionic surfactant for use in the present invention include SURFLON S-111, S-112, S-113 (made by Asahi Glass Co., Ltd.), FLUORAD FC-93, FC-95, FC-98, FC-129 (made by Sumitomo 3M Limited), UNIDYNE DS-101, DS-102 (made by Daikin Industries, Ltd.), MEGAFAC F-110, F-120, F-113, F-191, F-812, and F-833 (made by Dainippon Ink & Chemicals, Incorporated), EFTOP EF-102, 103, 104, 105, 112, 123A, 123B, 306A, 501, 201, 204 (made by Tohkem Products Corporation), and FTERGENT F-100, F-150 (Neos Co., Ltd.).

Examples of a cationic surfactant for use in the present invention include aliphatic primary, secondary and tertiary amine salts having a fluoroalkyl group; an aliphatic quaternary ammonium salt such as perfluoroalkyl ($C_6$–$C_{10}$) sulfonamide propyltrimethyl ammonium salt; benzalkonium salt; benzethonium salt; pyridinium salt; and imidazolinium salt.

The following cationic surfactants in Table 1 are particularly preferable for use in the present invention:

TABLE 1

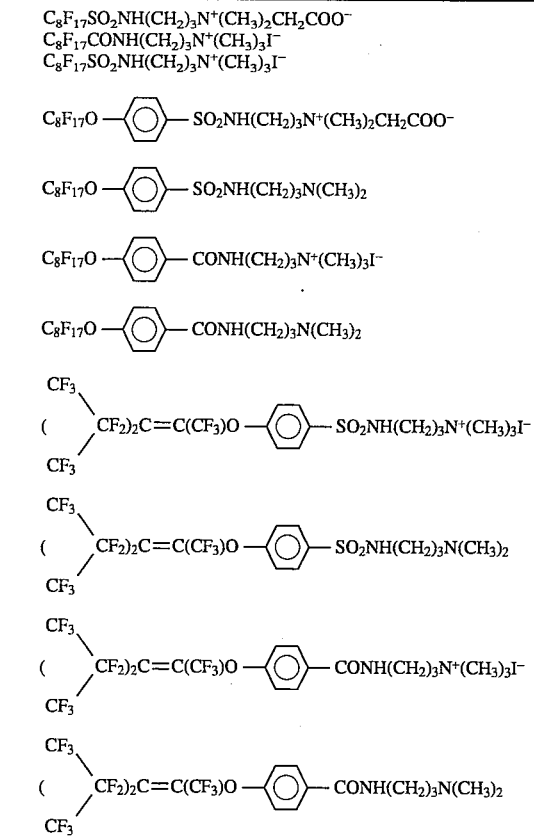

Examples of a commercially available anionic surfactant for use in the present invention include SURFLON S-121 (made by Asahi Glass CO., LTD.), FLUORAD FC-135 (made by Sumitomo 3M Limited), YUNIDYNE DS-202 (made by Daikin Industries, LTD.), MEGAFAC F-150, and F-824 (made by Dainippon Ink & Chemicals, Incorporated), EFTOP EF-132 (made by Tohkem Products Corporation), and FTERGENT F-300 (Neos Co., Ltd.).

The treatment of the polymer particles by such a surfactant can be conducted by mixing a slurry of the polymer particles with a hydrophilic organic liquid in which such a surfactant is dissolved, or with a mixture of a hydrophilic organic liquid and water in which such a surfactant is dissolved. In order to promote the treatment reaction, when necessary, the above mixture may be heated, or an auxiliary swelling agent with an appropriate solubility parameter (SP value) for diffusing the surfactant into the inside of the protrusions formed on the surface of the polymer particles may be added to the mixture.

When dyed or colored polymer particles are prepared, the above treatment can be carried out after the dyeing of the polymer particles.

When an unsaturated sulfonic acid monomer is used as an anionic monomer for the formation of the protrusions on the surface of the polymer particles and the above-mentioned treatment is conducted by use of a cationic or anionic surfactant having a fluoroalkyl group, salts formed by neutralizing a primary, secondary or tertiary amine having a fluoroalkyl group with an inorganic acid or an organic acid such as acetic acid, lactic acid, or citric acid, and quaternary ammonium salts having a fluoroalkyl group are particularly preferable as cationic surfactants for the above-mentioned treatment.

When a (meth)acrylate or (meth)acrylamide having a primary, secondary or tertiary amino group, or in the form of a quaternary ammonium salt, is employed as a cationic polymer for the formation of the protrusions on the surface of the polymer particles, sulfonate type anionic surfactants such as fluoroalkylbenzene sulfonate; and surfactants having a sulfonic acid group such as fluoroaklylnaphthalene sulfonic acid, and formalin condensation products thereof, fluoroalkylsulfosuccinic acid ester salts, and fluoroalkylsulfoacetate are particularly preferable as anionic surfactants for the above-mentioned treatment.

The electric properties of a toner comprising the polymer particles thus treated by such surfactants are significantly improved in comparison with those of a toner comprising the polymer particles which are not treated by any of the surfactants.

The above-mentioned improved electric properties are particularly exhibited in a toner which comprises polymer particles of a polymer in which the combination of a functional group contained in the protrusions and a functional group contained in a cationic or anionic surfactant having a fluoroalkyl group is a combination of a sulfonic acid group and an amine or quaternary ammonium salt.

In the present invention, a toner with releasability can be provided by coating the surface of the above prepared colored polymer particles with a releasing agent or a binder agent in the form of finely-divided particles. To be specific, such coating of a releasing agent or finely-divided binder agent particles is carried out as follows:

The above-mentioned colored polymer particles and a releasing agent or finely-divided binder agent particles are mixed, whereby the releasing agent or finely-divided binder agent particles are caused to be uniformly deposited on the surface of the colored polymer particles, are fixed thereto, if necessary, with the application of heat or mechanical energy thereto.

By this coating treatment, a releasing agent or finely-divided binder agent particles can be firmly fixed to the surface of the colored polymer particles, so that a toner comprising the colored polymer particles coated with such a releasing agent or finely-divided binder agent particles has high durability and anti-offset performance when used in development by heat rollers, accordingly has high operational performance.

In the present invention, any releasing agents can be employed so long as they are capable of preventing the deposition of the toner on heat rollers and image transfer materials during thermal image fixing by using heat rollers.

Examples of such releasing agents include polyolefins such as low-molecular weight polyethylene, and polypropylene; and waxes.

Specific examples of waxes are vegetable waxes such as candelilla wax, carnauba wax, rice wax, and Japan wax; animal waxes such as bees wax, lanolin and spermaceti; mineral waxes such as montan wax, ceresine, and ozocerite; petroleum waxes such as paraffin wax, microcrystalline wax and petrolatum; synthetic coal waxes such as mantanic acid wax, montanic ester wax, montanic partially saponified ester wax and montanic soft wax; and synthetic fat-and-oil type waxes such as Fischer-Tropsch wax; and hardened castor oil.

In addition, the following 12-hydroxystearic acid and derivatives thereof can be employed as releasing agents:

12-hydroxystearamide,

N-(2-hydroxyethyl)-12-hydroxystearamide,

N,N'-ethylenebis-12-hydroxystearamide,

N,N'-hexamethylenebis-12-hydroxystearamide,

N,N'-xylylenebis-12-hydroxystearamide, methyl 12-hydroxystearate, butyl 12-hydroxystearate, propylene glycol=mono 12-hydroxystearate, glycerine=mono 12-hydroxystearate, ethylene glycol=mono 12-hydroxystearate, glycerin=tri 12-acetoxystearate, lithium 12-hydroxystearate, and calcium 12-hydroxystearate.

The following fatty acid amides such as lauramide, stearamide, oleamide, erucamide, ricinolamide, 12-hydroxystearamide, and special fatty acid amides, can also be employed as the releasing agents.

Furthermore, the following fatty acid amide derivatives can be employed as the releasing agents:

N,N'-ethylenebislauramide,

N,N'-methylenebisstearamide,

N,N'-ethylenebisstearamide,

N,N'-ethylenebisoleamide,

N,N'-ethylenebisbehenamide,

N,N'-ethylenebis-12-hydroxystearamide,

N,N'-butylenebisstearamide,

N,N'-hexamethylenebisstearamide,

N,N'-hexamethylenebisoleamide,

N,N'-xylylenebisstearamide, stearic acid monomethylol amide, coconut fatty acid monoethanol amide, stearic acid diethanol amide, N-oleylstearamide, N-oleyloleamide, N-stearylstearamide, N-stearyloleamide, N-oleylpalmitamide, N-stearylerucamide, N,N'-dioleyladipamide, N,N'-distearyladipamide, N,N'-dioleylsebacamide, N,N'-distearylsebacamide, N,N'-distearylterephthalamide, and N,N'-distearylisophthalamide.

Aliphatic amines, such as dodecylamine, tetradecylamine, octadecylamine, oleylamine, and dioctadecylamine, can also be employed as the releasing agents.

The following fatty acid esters of primary alcohols can also be employed as the releasing agents: methyl laurate, methyl myristate, methyl palmitate, methyl stearate, methyl coconut fatty acid, isopropyl myristate, butyl stearate, octadecyl stearate, and oleyl oleate.

The following fatty acid esters of polyhydric alcohols can also be employed as the releasing agents: glycerin fatty acid ester such as glycerin=mono-stearate, glycerin=monooleate, and glycerin=docosanolate; sorbitan fatty acid esters such as sorbitan =monopalmitate, sorbitan=monostearate, sorbitan= tristearate and sorbitan=monooleate; propylene glycol fatty acid ester such as propylene glycol=monopalmitate, and propylene glycol=monostearate; ethylene glycol fatty acid esters such as ethylene glycol =monostearate; and polyoxyethylene fatty acid esters such as polyoxyethylene= monostearate.

Furthermore, the following compounds can be employed as the releasing agents: alkali metal salts and alkali earth metal salts of higher fatty acids, such as calcium stearate, aluminum stearate, magnesium stearate, and calcium palmitate, and zinc salts and aluminum salts of higher fatty acids; hydrazides of higher fatty acids such as hydrazide of palmitic acid, and hydrazide of stearic acid; p-hydroxianilides of higher fatty acids such as p-hydroxyanil of myristic acid, and p-hydroxyanilide of stearic acid; β-diethylaminoethyl ester hydrochloride of higher fatty acids such as β-diethylaminoethyl ester hydrochloride of lauric acid, and β-diethylaminoethyl ester hydrochloride of stearic acid; fatty acid amide—formaldehyde condensation products such as stearamide—formaldehyde condensation product, and palmitamide—formaldehyde condensation product; and halogenated hydrocarbons such as chlorinated paraffin, and chlorinated propylene.

When the above-mentioned releasing agents are used in practice, the previously mentioned colored polymer particles are dispersed in a liquid, and the releasing agent in water or a hydrophilic organic liquid. In this case, it is preferably that the releasing agent be stably dispersed in the form of finely-divided particles in water or the hydrophilic organic liquid, and the previously mentioned colored polymer particles and the releasing agent be not soluble in water or the hydrophilic liquid and that the liquid in which the colored polymer particles are dispersed be compatible with water or the hydrophilic organic liquid.

Such releasing agent dispersion liquids are commercially available and also can be prepared, for example, by the following conventional methods:

(1) A releasing agent is dissolved in a solvent A in which the releasing agent is soluble to prepare a solution. This solution is added with stirring at high speed to a solvent B, which is compatible with solvent A, but in which the releasing agent is not soluble, to precipitate the releasing agent in the form of finely-divided particles, whereby a dispersion liquid of the releasing agent is obtained.

(2) Hot water is added with stirring at high speed to a liquid in which a releasing agent is fused to prepare a dispersion of the releasing agent. The dispersion is cooled to obtain a dispersion liquid of the releasing agent.

(3) A releasing agent is mixed with a liquid C in which the releasing agent is insoluble in a dispersing apparatus such as a ball mill to disperse the releasing agent in the liquid, whereby a dispersion of the releasing agent is obtained.

To the above prepared dispersion liquids, an ionic surfactant or a non-ionic surfactant, or a mixture of the two surfactants can be added as a dispersion stabilizer.

It is preferable that the ratio of the volume mean particle size (R) of the colored polymer particles to the volume mean particle size (r) of the finely-divided particles of the releasing agent in the dispersion liquid, that is, R/r be 5 or more. When the ratio R/r is less than 5, it is not always easy to uniformly deposit the releasing agent on the surface of the colored polymer particles and to firmly the releasing agent thereto, and accordingly, it becomes difficult to maintain uniform chargeability and durability when used as toner.

There is no particular limitation on the finely-divided particles of a binder agent for use in the present invention. The same resins as for the above-mentioned colored polymer particles, for example, styrene-acrylic resin, polyester resin, and epoxy resin, can be employed. The finely-divided particles of such resins can be produced by a dry fine pulverizing method using, for instance, a jet mill, or by a wet fine pulverizing method using, for instance, a ball mill, sand mill, or colloid mill. The wet fine pulverizing method is preferable for use in the present invention, because the finely-divided particles of such resins can be obtained in the form of a dispersion.

Such finely-divided particles of a binder resin can also be obtained by suspension polymerization and also by emulsion polymerization. However, a soap-free emulsion polymerization is preferable because neither an emulsifier nor a dispersing agent is substantially contained in the resin particles produced.

The above-mentioned releasing agent or the finely-divided particles of a binder resin (hereinafter referred to as finely-divided binder resin particles) can be deposited on the surface of the previously mentioned colored polymer particles as follows:

A slurry of the colored polymer particles and a slurry of a releasing agent, if necessary, with the addition of finely-divided binder resin particles thereto, are mixed and then dried, whereby the releasing agent can be deposited on the surface of the colored polymer particles, together with the binder resin particles when added thereto. For uniformly depositing the releasing agent, and the binder resin particles on the surface of the colored polymer particles and for obtaining particles free from aggregation, it is preferable to conduct spray drying, freezing drying, fluid bed drying, or medium fluid bed drying.

Alternatively, a releasing agent and finely-divided binder resin particles can be deposited on the surface of the colored polymer particles by utilizing the difference in the charges of the particles in the dispersion liquid. This is the so-called hetero aggregation and can be conducted so long as particles whose charged polarity is reversed or whose quantity of charge is changed depending upon the pH of the medium in which the particles are dispersed. Namely, the releasing agent and the finely-divided binder resin particles can be deposited in the form of a uniform layer on the surface of the colored polymer particles by utilizing electrostatic force generated by electric charges with opposite polarities or a difference in potential, which can be generated by adjusting the pH of the medium. In this deposition, the surfactants and an ionic group of a dispersion stabilizer employed when producing a releasing agent in the form of finely-divided particles, and ionic groups such as sulfuric acid group from potassium persulfate, and amine group from 2,2'-azobis(2-aminopropane)hydrochloride, which are formed from the fragments of an initiator employed for producing the finely-divided resin particles, play an important role.

The so-called hetero aggregation can be carried out by use of the following coagulating agents: inorganic electrolytes such as aluminum sulfate, basic aluminum chloride, sodium aluminate, ferric sulfate, ferrous sulfate, ferric chloride, calcium chloride, sulfuric acid, hydrochloric acid, carbonic acid, sodium carbonate, lime, electrolytic aluminum hydroxide, and electrolytic iron hydroxide; finely-divided inorganic particles such as kaolin, bentonite, terra abla, fly ash, and activated silicic acid; polymers with a molecular weight in the range of 1000 to tens of thousands, such as sodium alginate, sodium salt of carboxymethyl cellulose (CMC), water-soluble aniline resin hydrochloride, polythiourea acetate, polyethylene imine, polyvinyl benzyltrimethyl ammonium chloride, starch, water-soluble urea resin, and gelatin; and polymers with a molecular weight in the range of several millions, such as sodium polyacrylate, copolymers of salts of maleic acid, poly(acrylamide)acrylic acid, polyvinyl pyridine copolymer hydrochloride, polyacrylamide, and polyoxyethylene.

A releasing agent and finely-divided binder resin particles can be deposited in the form of a uniform layer on the surface of the polymer particles by adjusting the electrostatic interaction between the particles by neutralizing the ionic group on the surface of the polymer particles by use of an ionic surfactant.

It is preferable that the amount of the releasing agent to be deposited on the surface of the colored polymeric particles be in the range of 0.3 to 10 parts by weight, more preferably in the range of 0.5 to 5 parts by weight, to 100 parts by weight of the colored polymeric particles, in order that the releasing agent exhibit its effect appropriately.

In the present invention, by firmly depositing the releasing agent and the finely-divided binder resin particles on the surface of the colored polymer particles, the detachment of the releasing agent and the finely-divided binder resin particles from the surface of the colored polymer particles can be prevented, so that the durability and reliability of a toner comprising such colored polymer particles can be improved.

The releasing agent and the finely-divided binder resin particles can be fixed to the surface of the colored polymer particles by heat treatment or the application of mechanical energy thereto.

More specifically, when the releasing agent or the finely-divided binder resin particles are fixed to the surface of the colored polymer particles by the application of mechanical energy thereto, mechanical energy is applied to a mixture of the colored polymer particles and the releasing agent or to a mixture of the colored polymer particles and the finely-divided binder resin particles, for instance, by stirring the mixture with blades which are rotated at high speed, by bringing the mixture into an air flow which are circulated at high speed, or by causing the particles with each other or with a collision board.

Specific examples of a commercially available apparatus for the application of mechanical energy for the above-mentioned purpose include pulverizing apparatus with a reduced pulverizing air pressure which is lower than that of a normal pulverizing air pressure such as "Angmill" (Trademark) (made by Hoshokawa Micron Corporation), and "Inpact Mill" (Trademark) (made by Pneumatic Mfg. Co., Ltd.), and other pulverizing apparatus such as "Hybridization System" (Trademark) (made by Nara Machinery Co., Ltd.), "Kryptron SystemKosmos" (Trademark) (made by Kawasaki Heavy Industries, Ltd.), and an automatic mortar.

Furthermore, in the present invention, the above-mentioned apparatus for fixing the releasing agent or finely-divided binder resin particles to the colored polymer particles may be used in order to deposit the releasing agent or finely-divided binder resin particles on the colored polymer particles in a liquid. However, such fixing can be performed during a drying process, for instance, by using a medium fluid bed dryer "MSD" (Trademark) (made by Nara Machinery Co., Ltd.) or a medium fluid bed dryer "Slurry Dryer" (Trademark) (made by Okawara Mfg. Co., Ltd.), by which drying and fixing of the releasing agent or finely-divided binder resin particles can be performed simultaneously.

When necessary, additives such as a fluidity improving agent and a lubricant may be added to the thus produced toner of the present invention. Examples of the fluidity improving agent include hydrophobic silica and metal oxides such as titanium oxide and alumina. Examples of the lubricant include finely-divided particles of polyvinylidene fluoride and zinc stearate.

The features of this invention will become apparent in the course of the following description of exemplary embodiments which are given for illustration of the invention and are not intended to be limiting thereof.

EXAMPLE 1

The following components were placed in a glass reaction vessel equipped with a condenser, a nitrogen-introducing tube, a pair of stainless turbines, each having four blades slanted with a degree of 45°, with the diameter of the turbine being ⅔ the inner diameter of the reaction vessel, a motor for the stainless turbines, a dropping funnel, a thermometer, and a syringe inlet:

|  | Parts by Weight |
| --- | --- |
| Methanol | 60 |
| Ethanol | 20 |
| Distilled water | 10 |
| Polyvinyl pyrrolidone (weight average molecular weight: 40,000) | 2 |

The above mixture was stirred at room temperature and the polyvinyl pyrrolidone was completely dissolved in the mixture.

The reaction vessel was placed in a constant-temperature water bath by which the temperature of the reaction mixture can be controlled within a range of±0.1° C. Nitrogen was introduced into the reaction vessel through the nitrogen-introducing tube, with the reaction mixture being cooled to 5° C. The concentration of oxygen in the gas phase in the reaction system was reduced to 0.1 vol. % or less by the replacement of oxygen with the nitrogen by being monitored with a Galvanic-battery type oxygen analyzer.

When the temperature of the reaction mixture was cooled to 5° C., the following components were added to the reaction mixture through the dropping funnel:

|  | Parts by Weight |
| --- | --- |
| Styrene | 20 |
| Methyl acrylate | 10 |
| Ethyl acrylate | 10 |
| n-dodecylmercaptane | 0.15 |
| Divinyl benzene (converted to the amount of the effective component as being 100%) | 0.5 |

The concentration of oxygen in the reaction system increased to 0.5 vol. %. The oxygen was replaced with nitrogen, so that the concentration of oxygen in the reaction system was reduced to 0.1 vol. % or less.

The temperature of the constant-temperature water bath was elevated to 65° C., and when the temperature of the reaction mixture reached 60° C. the stirring speed was set at 100 rpm, and a solution of an initiator consisting of the following components was added dropwise by a syringe through the syringe inlet:

|  | Parts by Weight |
| --- | --- |
| 2,2'-azobis(2,4-dimethyl-valeronitrile) | 0.0016 |
| Methanol | 0.02 |

The reaction mixture was transparent for about 15 minutes after the addition of the solution of the initiator, but in about 15 minutes, the reaction mixture became milky white. The reaction mixture was then allowed to stand for 30 minutes and became further milky white.

A solution composed of the following components was added dropwise to the above milky white mixture through the dropping funnel over a period of 15 minutes:

|  | Parts by Weight |
| --- | --- |
| 2,2'-azobis(2,4-dimethyl-valeronitrile) | 0.8 |
| Methanol | 10 |

The polymerization was further continued for 5 hours and 30 minutes, and a mixture of the following components was added to the reaction mixture through a syringe:

|  | Parts by Weight |
| --- | --- |
| α-thioglycerol | 0.4 |
| 1,3-butanediol methacrylate | 0.6 |
| Methanol | 5 |

The polymerization was further continued for 10 hours, and part of the reaction mixture was then sampled by a syringe, with care being taken to avoid the evaporation of the liquid from the reaction mixture.

A small amount of hydroquinone was added to the sampled reaction mixture to terminate the polymerization. The sampled reaction mixture was then dried at room temperature for 5 hours, and then dried at 50° C. under reduced pressure until the weight of a solid polymer obtained became constant. The conversion of the monomers to the obtained polymer was calculated to be 79.2%, with the amounts of the dispersing agent and the initiator employed taken into consideration.

The temperature of the reaction mixture was lowered to 20° C. by decreasing the set temperature of the constant-temperature water bath, and a mixture of the following components for the formation of protrusions on polymer particles was added dropwise from the dropping funnel over a period of 2 hours:

|  | Parts by Weight |
| --- | --- |
| Methacrylamide propyl tri-methylammonium chloride | 1 |
| Methyl methacrylate | 19 |
| Methanol | 40 |
| Distilled water | 5 |

When the dropwise addition of the above components was completed, the reaction mixture was stirred at a stirring speed of 70 rpm for 1 hour, with the temperature thereof raised to 50° C.

A mixture of the following components was then added dropwise from a dropping funnel to the reaction mixture over a period of 30 minutes:

|  | Parts by Weight |
| --- | --- |
| 2,2'-azobisisobutyronitrile | 0.4 |
| Methanol | 7 |

The polymerization reaction was continued at 50° C. for 3 hours, and then the temperature of the reaction mixture was raised to 65° C., taking 1 hour. The polymerization reaction was further continued for 20 hours, whereby a milky white dispersion liquid was obtained.

Part of the milky white dispersion liquid was then sampled and a small amount of hydroquinone was added to the sampled dispersion liquid to terminate the polymerization. The sampled dispersion was then dried at room temperature for 5 hours, and then dried at 50° C. under reduced pressure until the weight of a solid polymer obtained became constant. The conversion of the monomers was found to have reached 98.7%, with the amounts of the dispersing agent and the initiator employed taken into consideration.

An extremely small amount of the milky white dispersion liquid was diluted by a large amount of distilled water, centrifuged, and then dispersed once again distilled water to remove unreacted components and the dispersing agent therefrom, whereby purified polymer particles were obtained.

The thus obtained polymer particles were inspected by a scanning electron microscope. Polymer particles with a substantially uniform particle size, with a plurality of hemispherical protrusions being formed with substantially equal intervals therebetween on the surface of the polymer particles, were observed. No newly formed fine polymer particles were found.

EXAMPLE 2

The following components were placed in the same glass reaction vessel as employed in Example 1:

|  | Parts by Weight |
| --- | --- |
| 2-propanol | 70 |
| Distilled water | 20 |
| Maleic anhydride - methyl vinyl ether copolymer (weight average molecular weight: 150,000) | 1.5 |

The above mixture was stirred at 70° C. for 5 hours, so that the maleic anhydride—methyl vinyl ether copolymer was partially esterified and dissolved in the reaction mixture.

The reaction vessel was placed in the same constant-temperature water bath as employed in Example 1, and nitrogen was introduced into the reaction vessel through the nitrogen-introducing tube, with the reaction mixture being cooled to 5° C. When the concentration of oxygen in the gas phase in the reaction system was reduced to 0.1 vol. % or less by the replacement of oxygen with the nitrogen as in Example 1, the following components were added to the reaction mixture through the dropping funnel:

| | Parts by Weight |
|---|---|
| Styrene | 30 |
| n-butyl methacrylate | 5 |
| Methyl acrylate | 15 |
| Carbon tetrachloride | 0.1 |
| Ethylene glycol dimethacrylate | 0.5 |

The concentration of oxygen in the reaction system increased to 0.6 vol. %. The oxygen was replaced with nitrogen, so that the concentration of oxygen in the reaction system was reduced to 0.1 vol. % or less.

The temperature of the constant-temperature water bath was elevated to 70° C., and when the temperature of the reaction mixture reached 65° C., the stirring speed was set at 75 rpm, and a solution of an initiator consisting of the following components was added dropwise over a period of 15 minutes by a syringe through the syringe inlet:

| | Parts by Weight |
|---|---|
| 2,2'-azobis(2,4,4-trimethyl-pentane) | 0.45 |
| 2-propanol | 5 |

The reaction mixture became milky white about 10 minutes after the addition of the solution of the initiator, and in about 15 minutes, the degree of the milky white state was further intensified, so that the turbines in the reaction vessel became almost invisible.

The polymerization reaction was further continued for 3 hours, and then a solution composed of the following components was added dropwise to the above milky white reaction mixture through the dropping funnel over a period of 15 minutes:

| | Parts by Weight |
|---|---|
| 2,2'-azobis(2-methoxy-2,4-dimethylvaleronitrile) | 0.75 |
| 2-propanol | 10 |

With the temperature of the reaction mixture raised to 80° C., the polymerization was further continued for 6 hours, and part of the reaction mixture was then sampled by a syringe, and the conversion of the monomers to the polymer was measured in the same manner as in Example 1. The result was that the conversion was 91.2%.

The temperature of the reaction mixture was lowered to 60° C., and a mixture of the following components for the formation of protrusions on polymer particles was separately added dropwise in nine separate lots from the dropping funnel over a period of 3 hours:

| | Parts by Weight |
|---|---|
| Methacrylic acid | 1 |
| Styrene | 9 |
| 2-propanol | 25 |

With the temperature of the reaction mixture raised to 80° C., a mixture of the following components was then added dropwise from a dropping funnel to the reaction mixture over a period of 15 minutes:

| | Parts by Weight |
|---|---|
| 2,2'-azobisisobutyronitrile | 0.6 |
| 2-propanol | 10 |

The polymerization reaction was continued at the same temperature for 10 hours, whereby a milky white dispersion liquid was obtained.

The conversion of the monomers was measured in the same manner as in Example 1. The result was that the conversion was 99.3%.

An extremely small amount of the milky white dispersion liquid was diluted by a large amount of distilled water, centrifuged, and then dispersed once again distilled water to remove unreacted components and the dispersing agent therefrom, whereby purified polymer particles were obtained.

The thus obtained polymer particles were inspected by a scanning electron microscope. Spherical polymer particles with a substantially uniform particle size, with a plurality of hemispherical protrusions being formed with substantially equal intervals therebetween on the surface of the polymer particles, were observed. No newly formed fine polymer particles were found.

EXAMPLE 3

A dispersion liquid of polymer particles with a conversion of 79.6%, without protrusions on the surface of the polymer particles, was obtained in the same manner as in Example 1.

Part of the dispersion liquid was sampled, and the polymer particles therein were inspected by a scanning electron microscope. It was observed that spherical polymer particles with a smooth surface, and a uniform particle size were formed.

The temperature of the polymer dispersion liquid was lowered to 20° C. by decreasing the set temperature of the constant-temperature water bath, and a mixture of the following components for the formation of protrusions on polymer particles was added dropwise from the dropping funnel over a period of 2 hours:

| | Parts by Weight |
|---|---|
| Methacryloyloxy ethyl tri-methylammonium chloride | 3 |
| Dimethylaminopropyl methacrylamide | 1 |
| Methylmethacrylate | 26 |
| Methanol | 75 |

When the dropwise addition of the above components was completed, with the temperature of the reaction mixture raised to 50° C., the reaction mixture was stirred at a stirring speed of 70 rpm for 1 hour.

A mixture of the following components was then added dropwise from a dropping funnel to the reaction mixture:

| | Parts by Weight |
|---|---|
| 2,2'-azobisisobutyronitrile | 0.5 |
| Methanol | 8 |

The polymerization reaction was continued at 50° C. for 3 hours, and then the temperature of the reaction mixture was raised from 50° C. to 65° C., taking 1 hour.

When the temperature of the reaction mixture reached 65° C., a mixture of the following components was further added dropwise to the reaction mixture through a dropping funnel:

|  | Parts by Weight |
| --- | --- |
| Methacryloyloxy ethyl tri-methylammonium chloride | 1 |
| Methyl methacrylate | 9 |
| Methanol | 25 |

The polymerization reaction was further continued for 20 hours, whereby a milky white dispersion liquid was obtained.

The conversion of the monomers was measured in the same manner as in Example 1. The result was that the conversion was 99.5%.

An extremely small amount of the milky white dispersion liquid was diluted by a large amount of distilled water, centrifuged, and then dispersed once again distilled water to remove unreacted components and the dispersing agent therefrom, whereby purified polymer particles were obtained.

The thus obtained polymer particles were inspected by a scanning electron microscope. Spherical polymer particles with a substantially uniform particle size, with a plurality of hemispherical protrusions being formed with substantially equal intervals therebetween on the surface of the polymer particles, were observed. No newly formed fine polymer particles were found.

EXAMPLE 4

A dispersion liquid of polymer particles with a conversion of 92.1%, without protrusions on the surface of the polymer particles, was obtained in the same manner as in Example 2.

Part of the dispersion liquid was sampled, and the polymer particles therein were inspected by a scanning electron microscope. It was observed that spherical polymer particles with a smooth surface, and a uniform particle size were formed.

The temperature of the polymer dispersion liquid was lowered to 60° C., and a mixture of the following components for the formation of protrusions on polymer particles was added dropwise to the reaction mixture through a micro-feeder pump over a period of 4 hours:

|  | Parts by Weight |
| --- | --- |
| t-butyl acrylamide sulfonic acid | 5 |
| Styrene | 20 |
| 2-propanol | 50 |

When the dropwise addition of the above components was completed, the temperature of the reaction mixture was gradually raised to 80° C. over a period of 2 hours, and a solution composed of the following components was added dropwise to the reaction mixture from a dropping funnel, with stirring, over a period of 15 minutes:

|  | Parts by Weight |
| --- | --- |
| 4,4'-azobis(4-cyano-pentanoic acid) | 0.75 |
| 2-propanol | 10 |
| Distilled water | 5 |

The polymerization reaction was further continued at 80° C. for 8 hours, whereby a milky white dispersion liquid was obtained.

The conversion of the monomers was measured in the same manner as in Example 1. The result was that the conversion was 99.2%.

An extremely small amount of the milky white dispersion liquid was diluted by a large amount of distilled water, centrifuged, and then dispersed once again distilled water to remove unreacted components and the dispersing agent therefrom, whereby purified polymer particles were obtained.

The thus obtained polymer particles were inspected by a scanning electron microscope. Spherical polymer particles with a substantially uniform particle size, with a plurality of hemispherical protrusions being formed with substantially equal intervals therebetween on the surface of the polymer particles, were observed. No newly formed fine polymer particles were found.

EXAMPLE 5

20 parts by weight of methanol were added to 3 parts by weight of a commercially available dye "Oil Black 860" (made by Orient Chemical Industries, Ltd.) and dissolved therein with the application of heat thereto. The mixture was cooled and filtered through a 1 μm microfilter to prepare a dye solution.

40 parts by weight of the milky white dispersion of the polymer particles with a conversion of 98.7% which was finally obtained in Example 1 were added to 10 parts by weight of the above prepared dye solution. The mixture was stirred at 50° C. for 2 hours and was then cooled to room temperature.

The cooled mixture was centrifuged and the supernatant was removed therefrom, whereby a slurry of dyed polymer particles was obtained. The thus obtained slurry of dyed polymer particles was dispersed again in a mixed solvent composed of 50 parts by weight of methanol and 50 parts by weight of water, whereby a dispersion liquid was obtained.

The thus obtained dispersion was again centrifuged to obtain a slurry of dyed polymer particles and the slurry was dispersed again in the same mixed solvent as mentioned above. This process was repeated once again, so that the same centrifuge and redispersing process was repeated three times in total, whereby a dispersion liquid of polymer particles dyed with "Oil Black 860" was obtained.

The thus obtained dispersion liquid was dried by a commercially available small spray dryer (Trademark "Yamato Minispray" made by Yamato Kagaku Co., Ltd.), whereby colored polymer particles were obtained.

0.5 parts by weight of a commercially available hydrophobic silica (Trademark "R972", made by Nippon Aerosil Co., Ltd.) were mixed with 100 parts by weight of the above obtained colored polymer particles in a mixer, whereby a toner No. 1 of the present invention for use in electrophotography was obtained.

EXAMPLE 6

The procedure for preparing the toner No. 1 of the present invention in Example 5 was repeated except that the milky white dispersion of the polymer particles with a conversion of 98.7% employed in Example 5 was replaced by the milky white dispersion of the polymer particles with a conversion of 99.3% which was finally obtained in Example 2, whereby a toner No. 2 of the present invention for use in electrophotography was obtained.

EXAMPLE 7

The procedure for preparing the toner No. 1 of the present invention in Example 5 was repeated except that the milky white dispersion of the polymer particles with a conversion of 98.7% employed in Example 5 was replaced by the milky white dispersion of the polymer particles with a conversion of 99.5% which was finally obtained in Example 3, whereby a toner No. 3 of the present invention for use in electrophotography was obtained.

FIG. 1 shows a microscopic photograph of the above toner No. 3 taken by a scanning electron microscope. In the microscopic photograph, protrusions 2 are observed on the surface of the polymer particles 1.

EXAMPLE 8

The procedure for preparing the toner No. 1 of the present invention in Example 5 was repeated except that the milky white dispersion of the polymer particles with a conversion of 98.7% employed in Example 5 was replaced by the milky white dispersion of the polymer particles with a conversion of 99.2% which was finally obtained in Example 4, whereby a toner No. 4 of the present invention for use in electrophotography was obtained.

EXAMPLE 9

0.5 parts by weight of a surfactant of the following formula were added to 100 parts by weight of the solid component contained in the dispersion liquid of polymer particles dyed with "Oil Black 860" which was finally obtained in Example 6 before the preparation of the toner No. 2 of the present invention, whereby a dispersion liquid was prepared:

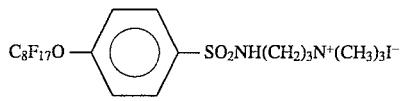

The thus prepared dispersion liquid was stirred at room temperature.

A small portion of the above dispersion liquid was placed in a vessel and gradually heated, with stirring, on a water bath, whereby the maximum temperature at which the colored polymer particles were not merged into one lump or did not aggregate was determined to be 45° C.

Therefore, the remaining dispersion liquid was heated to 45° C. and was stirred at 45° C. for 2 hours, then cooled, and filtered, whereby a cake of colored polymer particles treated with the above-mentioned surfactant was obtained.

The thus obtained cake of the colored polymer particles was dispersed in a mixed solvent composed of water and methanol (1:1 in volume ratio), and was then filtered, whereby a cake of the colored polymer particles was obtained.

The thus obtained cake of the colored polymer particles was dried at room temperature overnight and was then dried at 30° C. under reduced pressure until the weight of the cake became constant.

The thus dried, loosely coagulated cake of the colored polymer particles was crushed in a mixer, whereby colored polymer particles treated with the above-mentioned surfactant were obtained.

0.5 parts by weight of a commercially available hydrophobic silica (Trademark "R972", made by Nippon Aerosil Co., Ltd.) were uniformly mixed with 100 parts by weight of the above obtained colored polymer particles in a mixer, whereby a toner No. 5 of the present invention for use in electrophotography was obtained.

EXAMPLE 10

The procedure for the preparation of the toner No. 5 of the present invention was repeated except that the dispersion liquid of polymer particles dyed with "Oil Black 860" employed in Example 9 was replaced by the dispersion liquid of polymer particles dyed with "Oil Black 860" prepared in Example 8 before the preparation of the toner No. 4 of the present invention, whereby a toner No. 6 of the present invention for use in electrophotography was obtained.

COMPARATIVE EXAMPLE 1

The following components were placed in the same glass reaction vessel as employed in Example 1:

|  | Parts by Weight |
| --- | --- |
| Methanol | 60 |
| Ethanol | 20 |
| Distilled water | 10 |
| Polyvinyl pyrrolidone (weight average molecular weight: 40,000) | 2 |

The above mixture was stirred at room temperature and the polyvinyl pyrrolidone was completely dissolved in the mixture.

The reaction vessel was placed in the same constant-temperature water bath as employed in Example 1.

Nitrogen was introduced into the reaction vessel through the nitrogen-introducing tube, with the reaction mixture being cooled to 5° C. The concentration of oxygen in the gas phase in the reaction system was reduced to 0.1 vol. % or less by the replacement of oxygen with the nitrogen by being monitored with a Galvanic-battery type oxygen analyzer.

When the temperature of the reaction mixture was cooled to 5° C., the following components were added to the reaction mixture through the dropping funnel:

|  | Parts by Weight |
| --- | --- |
| Styrene | 20 |
| Methyl acrylate | 10 |
| Ethyl acrylate | 10 |
| n-dodecylmercaptane | 0.15 |
| Divinyl benzene (converted to the amount of the effective component as being 100%) | 0.5 |

The concentration of oxygen in the reaction system increased to 0.5 vol. %. The oxygen was replaced with nitrogen, so that the concentration of oxygen in the reaction system was reduced to 0.1 vol. % or less.

The temperature of the constant-temperature water bath was elevated to 65° C., and when the temperature of the reaction mixture reached 60° C., the stirring speed was set at 100 rpm, and a solution of an initiator consisting of the following components was added dropwise by a syringe through the syringe inlet:

| | Parts by Weight |
|---|---|
| 2,2'-azobis(2,4-dimethyl-valeronitrile) | 0.0016 |
| Methanol | 0.02 |

The reaction mixture was transparent for about 15 minutes after the addition of the solution of the initiator, but in about 15 minutes, the reaction mixture became milky white. The reaction mixture was then allowed to stand for 30 minutes and became further milky white.

A solution composed of the following components was added dropwise to the above milky white mixture through the dropping funnel over a period of 15 minutes:

| | Parts by Weight |
|---|---|
| 2,2'-azobis(2,4-dimethyl-valeronitrile) | 0.8 |
| Methanol | 10 |

The polymerization was further continued for 5 hours and 30 minutes, and a mixture of the following components was added to the reaction mixture through a syringe:

| | Parts by Weight |
|---|---|
| α-thioglycerol | 0.4 |
| 1,3-dutanediol methacrylate | 0.6 |
| Methanol | 5 |

The polymerization was further continued for 20 hours. Part of the reaction mixture was then sampled by a syringe and the conversion of the monomers was measured in the same manner as in Example 1. The result was that the conversion was 89.5%

Part of the dispersion liquid was sampled, and the polymer particles therein were inspected by a scanning electron microscope. It was observed that spheric polymer particles with a smooth surface, and a uniform particle size were formed.

The polymer particles in the above prepared dispersion liquid were dyed in the same manner as in Example 5, and a comparative toner No. 1 for use in electrophotography was produced in the same manner as in Example 5.

COMPARATIVE EXAMPLE 2

The following components were placed in the same glass reaction vessel as employed in Example 1:

| | Parts by Weight |
|---|---|
| Methanol | 60 |
| Ethanol | 20 |
| Distilled water | 10 |
| Polyvinyl pyrrolidone (weight average molecular weight: 40,000) | 2 |

The above mixture was stirred at room temperature and the polyvinyl pyrrolidone was completely dissolved in the mixture. The reaction vessel was placed in the same constant-temperature water bath as employed in Example 1.

Nitrogen was introduced into the reaction vessel through the nitrogen-introducing tube, with the reaction mixture being cooled to 5° C. The concentration of oxygen in the gas phase in the reaction system was reduced to 0.1 vol. % or less by the replacement of oxygen with the nitrogen by being monitored with a Galvanic-battery type oxygen analyzer.

When the temperature of the reaction mixture was cooled to 5° C., the following components were added to the reaction mixture through the dropping funnel:

| | Parts by Weight |
|---|---|
| Styrene | 20 |
| Methyl acrylate | 10 |
| Ethyl acrylate | 10 |
| n-dodecylmercaptane | 0.15 |
| Divinyl benzene (converted to the amount of the effective component as being 100%) | 0.5 |

The concentration of oxygen in the reaction system increased to 0.5 vol. %. The oxygen was replaced with nitrogen, so that the concentration of oxygen in the reaction system was reduced to 0.1 vol. % or less.

The temperature of the constant-temperature water bath was elevated to 65° C., and when the temperature of the reaction mixture reached 60° C., the stirring speed was set at 100 rpm, and a solution of an initiator consisting of the following components was added dropwise by a syringe through the syringe inlet:

| | Parts by Weight |
|---|---|
| 2,2'-azobis(2,4-dimethyl-valeronitrile) | 0.0016 |
| Methanol | 0.02 |

The reaction mixture was transparent for about 15 minutes after the addition of the solution of the initiator, but in about 15 minutes, the reaction mixture became milky white. The reaction mixture was then allowed to stand for 30 minutes and became further milky white.

A solution composed of the following components was added dropwise to the above milky white mixture through the dropping funnel over a period of 15 minutes:

| | Parts by Weight |
|---|---|
| 2,2'-azobis(2,4-dimethyl-valeronitrile) | 0.8 |
| Methanol | 10 |

The polymerization was further continued for 5 hours and 30 minutes, and a mixture of the following components was added to the reaction mixture through a syringe:

| | Parts by Weight |
|---|---|
| α-thioglycerol | 0.4 |
| 1,3-dutanediol methacrylate | 0.6 |
| Methanol | 5 |

The polymerization was further continued for 10 hours. Part of the reaction mixture was then sampled by a syringe and the conversion of the monomers was measured in the same manner as in Example 1.

The result was that the conversion of the monomers was 78.3%.

The temperature of the reaction mixture was lowered to 20° C. by decreasing the set temperature of the constant-temperature water bath, and a mixture of the following components for the formation of protrusions on polymer particles was added dropwise from the dropping funnel over a period of 2 hours:

|  | Parts by Weight |
| --- | --- |
| Methacrylamide propyl tri-methylammonium chloride | 1 |
| Methanol | 40 |
| Distilled water | 10 |

When the dropwise addition of the above components was completed, the reaction mixture was stirred at a stirring speed of 70 rpm for 1 hour, with the temperature thereof raised to 50° C.

A mixture of the following components was then added dropwise from a dropping funnel to the reaction mixture over a period of 30 minutes:

|  | Parts by Weight |
| --- | --- |
| 2,2'-azobisisobutyronitrile | 0.4 |
| Methanol | 7 |

The polymerization reaction was continued at 50° C. for 3 hours, and then the temperature of the reaction mixture was raised to 65° C., taking 1 hour. The polymerization reaction was further continued for 20 hours, whereby a milky white dispersion liquid was obtained.

Part of the milky white dispersion liquid was then sampled and the conversion of the monomers was measured in the same manner as in Example 1. The result was that the conversion of the monomers was 85.4%.

An extremely small amount of the milky white dispersion liquid was diluted by a large amount of distilled water, centrifuged, and then dispersed once again distilled water to remove unreacted components and the dispersing agent therefrom, whereby purified polymer particles were obtained.

Part of the dispersion liquid was sampled, and the polymer particles therein were inspected by a scanning electron microscope. It was observed that spherical polymer particles with a smooth surface, and a uniform particle size were formed.

The polymer particles in the above prepared dispersion liquid were dyed in the same manner as in Example 5, and a comparative toner No. 2 for use in electrophotography was produced in the same manner as in Example 5.

COMPARATIVE EXAMPLE 3

The colored polymer particles before being mixed with the hydrophobic silica, obtained in Comparative Example 1, were treated so as to make the surface thereof uneven as follows:

1880 parts by weight of ion-exchange water were placed in a reaction vessel including a separable glass flask equipped with a condenser, a nitrogen-introducing tube, a stirrer with semicircular teflon blades, a motor for the stirrer, and a dropping funnel.

The temperature of the ion-exchange water was raised to 75° C., and the oxygen in the flask was replaced with nitrogen to a concentration of 0.5 % or less.

20 parts of methyl methacrylate were added to the ion-exchange water in one lot through the dropping funnel, with stirring at a stirring speed of 200 rpm. The mixture was stirred, with the temperature thereof maintained at 75° C., for 2 hours.

A mixture of the following components was added dropwise to the reaction mixture over a period of 1 hour:

|  | Parts by Weight |
| --- | --- |
| Ion-exchange water | 120 |
| Potassium persulfate | 1.08 |
| Sodium styrenesulfonate | 0.0384 |

The above mixture was stirred for 3 hours, and a light milky white dispersion liquid was obtained.

A mixture of the following components was added dropwise to the above dispersion liquid over a period of 15 minutes:

|  | Parts by Weight |
| --- | --- |
| Ion-exchange water | 87 |
| Potassium persulfate | 2.08 |

A mixture of the following components was further added dropwise to the above mixture over a period of 4 hours:

|  | Parts by Weight |
| --- | --- |
| Styrene | 80 |
| n-butyl methacrylate | 60 |
| Methyl methacrylate | 60 |

The above mixture was stirred at 75° C. for 10 hours, and was then cooled to room temperature. The thus obtained dispersing liquid was filtered through a 400-mesh filter to remove large polymer particles therefrom, whereby a dispersion liquid of finely-divided polymer particles was obtained. The thus formed finely-divided polymer particles were inspected by a scanning electron microscope. The polymer particles were spherical particles with a uniform particle size of 0.31 μm.

The thus obtained dispersion liquid of the finely-divided polymer particles was placed in a round-bottom flask and was frozen so as to form a thin layer on the inside of the flask while the flask was immersed in an acetone solution cooled with dry ice and rotated slantingly.

The flask was then incorporated into a freezing dryer and the content of the flask was dried for 10 hours, whereby finely-divided polymer particles were obtained.

100 parts by weight of the colored polymer particles obtained in Comparative Example 1 before being mixed with the hydrophobic silica, and 10 parts by weight of the above obtained finely-divided polymer particles were mixed in a commercially available mixer (Trademark "OM DIZZER", made by Nara Machinery Co., Ltd.) at a speed of revolution of 1000 rpm for 2 minutes, whereby the finely-divided polymer particles were deposited on the surface of the colored polymer particles.

The thus prepared finely-divided-polymer-particles deposited colored polymer particles were inspected by a scanning electron microscope. It was observed that all the colored polymer particles bore the finely-divided polymer particles, but the finely-divided polymer particles were coagulated from place to place to a large extent.

The above mixture was then subjected to a fixing treatment by "Hybridization System NHS-1" (made by Nara Machinery Co., Ltd.) at 6000 rpm for 3 minutes, whereby the finely-divided polymer particles were fixed to the surface of the colored polymer particles.

The above colored polymer particles were inspected by a scanning electron microscope. It was observed that the coagulated finely-divided polymer particles disappeared. Undulations of 0.1 to 0.3 μm were observed on the surface of the colored polymer particles, but there were no spherical finely-divided polymer particles on the surface of the colored polymer particles, and the so-called protrusions in the present invention were not recognized on the surface of the colored polymer particles.

COMPARATIVE EXAMPLE 4

100 parts by weight of the colored polymer particles obtained in Comparative Example 1 before being mixed with the hydrophobic silica were dispersed with stirring, with the application of ultrasonic wave thereto, in 100 parts by weight of ion-exchange water in which 0.33 parts by weight of lauryl methyl ammonium chloride were dissolved, whereby a dispersion liquid was obtained.

To the thus obtained dispersion liquid were gradually added 100 parts by weight of the dispersion liquid of finely-divided polymer particles obtained in Comparative Example 3 which was not yet subjected to the freezing drying.

When 20 parts by weight of the dispersion liquid of finely-divided polymer particles were added to the first obtained dispersion liquid, the viscosity of the mixture was abruptly increased so high that it was difficult to stir the mixture. Therefore, with the number of revolution for the stirring increased, the remaining dispersion liquid of finely-divided polymer particles was added and mixed with the first dispersion liquid, whereby a dispersion liquid was obtained.

The thus obtained dispersion liquid was inspected by an optical microscope. It was observed that the finely-divided polymer particles were not much coagulated, but the colored polymer particles were joined via the finely-divided polymer particles which served as the bridges therefor.

Part of the above dispersion liquid was sampled and gradually heated. As a result, when the dispersion was heated to 68° C., the dispersion liquid was completely coagulated and solidified. It was impossible to crush the solidified dispersion even after dried because the colored polymer particles were fused and merged tightly.

For the above reason, the remaining above dispersion was subjected to heat treatment at 60° C. for 2 hours, filtered, washed and dried, whereby composite polymer particles were obtained.

0.5 parts by weight of a commercially available hydrophobic silica (Trademark "R972", made by Nippon Aerosil Co., Ltd.) were mixed with 100 parts by weight of the above obtained composite polymer particles in a mixer in the same manner as in Example 5, whereby a comparative toner No. 4 of for use in electrophotography was obtained.

The thus prepared comparative toner No. 4 was inspected by a scanning electron microscope. As a result, it was observed that the finely-divided polymer particles on the surface of the colored polymer particles were not fused, but were deposited or attached thereto, with their spherical shapes retained. However, when the comparative toner was placed on a glass plate and some pressure was applied thereto by a silicone rubber blade, a large amount of the finely-divided polymer particles were easily detached from the colored polymer particles.

The shape, charging characteristics, and operational performances of each of the toners produced above, when used in practice, in a copying machine, are shown in the following Table 2. The results shown in Table 2 indicate that the protrusions formed on the surface of polymer particles have significant favorable effects on the image transfer performance and cleaning performance, and the treatment of the polymer particles with a surfactant has favorable effects on the environmental stability. In contrast, finely-divided polymer particles merely deposited on the surface of the polymer particles do not have any conspicuous advantageous effects on any of the above-mentioned characteristics and performances of the toner.

TABLE 2

| No | $dv^{1)}$ | $dn^{1)}$ | dv/dn | $h^{2)}$ | $D^{2)}$ | h/D | Ratio of Protrusions-occupying Area | $q/m(1)^{4)}$ | $q/m(2)^{5)}$ | Ratio of Charges in charge Quantity of Toner by changes in Environmental Conditions | Image Transfer Ratio | Cleaning Performance |
|---|---|---|---|---|---|---|---|---|---|---|---|---|
| Ex. 5 | 5.26 | 5.18 | 1.015 | 0.3 | 5.1 | 0.06 | 8 | +32 | +16 | 65 | 92 | 4 |
| Ex. 6 | 6.12 | 6.01 | 1.018 | 0.4 | 6.0 | 0.07 | 15 | −36 | −19 | 60 | 93 | 4 |
| Ex. 7 | 5.43 | 5.32 | 1.021 | 1.1 | 5.3 | 0.21 | 9 | +55 | +32 | 52 | 99 | 5 |
| Ex. 8 | 6.48 | 6.32 | 1.025 | 1.3 | 6.3 | 0.21 | 17 | −42 | −22 | 61 | 99 | 5 |
| Ex. 9 | 6.18 | 6.06 | 1.019 | 0.4 | 6.1 | 0.07 | 15 | −41 | −30 | 32 | 92 | 4 |
| Ex. 10 | 6.51 | 6.36 | 1.024 | 1.3 | 6.4 | 0.20 | 17 | −48 | −46 | 5 | 99 | 5 |
| Comp. Ex. 1 | 5.16 | 5.08 | 1.016 | 0 | 5.1 | 0 | 0 | +25 | +6 | 120 | 65 | 1 |
| Comp. Ex. 2 | 5.17 | 5.07 | 1.019 | 0 | 5.1 | 0 | 0 | +35 | +16 | 73 | 53 | 1 |
| Comp. Ex. 3 | 5.43 | 5.08 | 1.068 | —9) | 5.2 | —9) | —9) | −21 | −8 | 90 | 74 | 2 |
| Comp. Ex. 4 | 7.23 | 5.48 | 1.32 | 0.2 | 6.0 | 0.03 | 5 | −27 | −7 | 115 | 81 | $2^{10)}$ |

In the above table, notes 1) to 10) denote as follows:

1) dv and dn respectively represent the volume mean particle size of particles and the number mean particle size with a unit of μm, which are obtained by Coulter counter by counting 30,000 particles, using a 100 μm aperture tube.

2) h and D respectively represent the average height of the protrusions measured from the surface of the polymer particles to the top thereof, and the average diameter of the polymer particles without including the protrusions. These average values are obtained by measuring the external shapes of 10 toner particles chosen arbitrarily by a scanning electron microscope.

3) The ratio of protrusions-occupying area is the ratio of the area on the surface of the polymer particles occupied by the protrusions to the entire surface of the polymer particles. These areas are measured from the external shapes of the particles by a scanning electron microscope.

4) q/m(1) represents the quantity of electric charge per unit weight of a toner, with a unit of μC/g, measured at 10° C., 15% RH (relative humidity). The quantity of electric charge is measured by the steps of (1) mixing 2 parts by weight of the toner with 100 parts by weight of a carrier comprising silicone-coated iron carrier particles at 10° C., 15% RH (relative humidity), (2) charging the toner by vigorously stirring the toner under the application of high electric field thereto, and (3) separating the toner from the carrier by blowing the mixture of the toner and the carrier.

5) q/m(2) represents the quantity of electric charge per unit weight of a toner, with a unit of μC/g, measured at 30° C., 90% RH (relative humidity), with the same steps as in the case of q/m(1).

6) The ratio of charges in charge quantity of toner by the changes in the environmental conditions is indicated by $\{[q/m(1)-q/m(2)]/\frac{1}{2}[q/m(1)+q/m(2)]\}\times 100\%$. The larger the value of this ratio, the larger the variation in the charge quantity of the toner depending upon the changes in the environmental conditions.

7) In the case of a toner which is negatively charged, the image transfer ratio thereof is determined by the steps of making toner images on a photoconductor df a commercially available copying machine (Trademark "IMAGIO 420", made by Ricoh Co., Ltd.), stopping the copying machine during an image transfer step to take out the photoconductor, and sampling the quantity of the toner from the surface of the photoconductor by use of an adhesive tape, that is, the amount of the toner obtained from the surface of the photoconductor by the adhesive tape before the image transfer (after the development), and the amount of the toner obtained from the surface of the photoconductor by the adhesive tape after the image transfer, and determining the value of the image transfer ratio in accordance with the following formula:

[Amount of toner remaining on the photoconductor after image transfer]/[Amount of toner deposited on the photoconductor before image transfer (after development)]×100%.

In the case of a toner which is positively charged, the image transfer ratio thereof is determined in accordance with the same procedure as mentioned above except that the copying machine "IMAGIO 420" is replaced by a commercially available copying machine (Trademark "FT 4520", made by Ricoh Company, Ltd.).

8) The cleaning performance is determined by any of the above-mentioned copying machines by the steps of making 100 A-3 size copies of a solid black image, stopping the copying machine in the course of a cleaning step for a 101 the copy, taking out the photoconductor from the copying machine, and sampling the toner remaining on a cleaning blade for the photoconductor by use of an adhesive tape. In the evaluation shown in Table 2, the larger the number, the better the cleaning performance.

9) "–" denotes that the shape of protrusions is not clear and protrusions cannot be recognized.

10) A film of finely-divided polymer particles is formed on the surface of the photoconductor in its entirely.

What is claimed is:

1. A polymerization method comprising the steps of:

polymerizing a vinyl monomer in the presence of a polymeric dispersing agent in a hydrophilic organic liquid in which said vinyl monomer is soluble, but in which a polymer formed from said vinyl monomer swells or is substantially insoluble, optionally in the presence of a cross-linking agent and a chain transfer agent, thereby preparing first polymer particles, said dispersing agent, said liquid, said monomer and said particles when prepared constituting a polymerization system; and continuing the polymerization with the addition to said polymerization system of a vinyl monomer which, when polymerized, provides a polymer with a glass transition point higher than that of said first polymer particles, and an anionic monomer or a cationic monomer, thereby producing polymer particles which are substantially spherical and have protrusions on the surface of each polymer particle, with a narrow particle size distribution.

* * * * *